United States Patent [19]

Sumimoto

[11] Patent Number: 5,522,070
[45] Date of Patent: May 28, 1996

[54] COMPUTER RESOURCE DISTRIBUTING METHOD AND SYSTEM FOR DISTRIBUTING A MULTIPLICITY OF PROCESSES TO A PLURALITY OF COMPUTERS CONNECTED IN A NETWORK

[75] Inventor: Shinji Sumimoto, Kawasaki, Japan

[73] Assignee: Fujitsu Limited, Kawasaki, Japan

[21] Appl. No.: 445,793

[22] Filed: May 23, 1995

Related U.S. Application Data

[63] Continuation of Ser. No. 32,866, Mar. 17, 1993, abandoned.

[30] Foreign Application Priority Data

Mar. 19, 1992 [JP] Japan ..................... 4-063771

[51] Int. Cl.⁶ ..................... G06F 7/00
[52] U.S. Cl. ..................... 395/650; 364/DIG. 1; 364/281.8; 364/281.3; 364/280
[58] Field of Search ..................... 395/650, 700

[56] References Cited

U.S. PATENT DOCUMENTS

| | | | |
|---|---|---|---|
| 4,318,173 | 3/1982 | Freedman et al. | 364/200 |
| 4,394,727 | 7/1983 | Hoffman et al. | 364/200 |
| 4,495,570 | 1/1985 | Kitajima et al. | 364/200 |
| 4,954,945 | 9/1990 | Inoue | 364/200 |
| 5,031,089 | 7/1991 | Liu et al. | 364/200 |
| 5,109,512 | 4/1992 | Bahr et al. | 395/650 |
| 5,115,499 | 5/1992 | Stiffler et al. | 395/425 |
| 5,136,708 | 8/1992 | Lapourtre et al. | 395/650 |
| 5,249,290 | 9/1993 | Heizer | 395/650 |
| 5,293,620 | 3/1994 | Barabash et al. | 395/650 |

OTHER PUBLICATIONS

B. Narahari & R. Krishnamurti, "Algorithm for Scheduling Independent Jops on Partitionable Hypercubes", 1992 IEEE.
Rutger Hofman & Willem G. Vree, "Evaluation of Distributed Hierarchical Scheduling with Explicit Grain Size Control", 1992 IEEE.
Dan Christian Marinescu, "Scheduled and Nonscheduled Access in a Distributed System Based Upon a Functional Communication Model", 1988 IEEE.

*Primary Examiner*—Kevin A. Kriess
*Attorney, Agent, or Firm*—Staas & Halsey

[57] ABSTRACT

When amounts of processing of processes to be distributed are known, a scheduler in a client allots the processes in order of their respective amounts of processing to computers in ascending order respective of cumulative amounts of processing of the computer. The cumulative amount of processing in each computer is updated by adding the amount of processing of the allotted process to the cumulative amount of processing of the computer each time a process is allotted to a computer. Each computer supplies situation data such as usage, together with reliability thereof to a server which distributes computers, and the server allots usable computers to the client on the basis of these data. The agent of each usable computer supplies a resource use token to the client so as to permit exclusive use of a computer resource.

27 Claims, 32 Drawing Sheets

FIG. 12

| | 13c-1 | 13c-2 | 13c-3 | 13c-4 | 13c-5 | 13c-6 |
|---|---|---|---|---|---|---|
| | Seq | Starting process | Execution record data | File size | Execution mode | P.ID |
| | 1 | | | | | |
| | 2 | | | | | |
| | 3 | | | | | |
| | ⋮ | ⋮ | ⋮ | ⋮ | ⋮ | ⋮ |

FIG. 13

| Seq 13c-1 | Starting process 13c-2 | Execution record data 13c-3 | File size 13c-4 | Execution mode 13c-5 | P.ID 13c-6 |
|---|---|---|---|---|---|
| 1 | cc -c x.c | | 100KB | self | |
| 2 | cc -c y.c | | 200KB | self | |
| 3 | cpp z.c | | 150KB | pipe (1-1) | |
| 4 | ccl -O | | 150KB | pipe (1-2) | |
| 5 | as > z.o | | 150KB | pipe (1-3) | |
| 6 | ld z.o x.o y.o -o a.out | | | gang (1,2,3,4,5) | |

| Seq | Execution record data |
|-----|-----|
| 1 | ⟨NONE⟩ |
| 2 | ⟨NONE⟩ |
| 3 | P:100 |
| 4 | P:20 |
| 5 | P:40 |
| 6 | ⟨NONE⟩ |

FIG. 15

| Seq | Starting processing | Execution record data | File size | Execution mode | P.ID |
|---|---|---|---|---|---|
| 1 | cc -c x.c | <NONE> | 100KB | self | |
| 2 | cc -c y.c | <NONE> | 200KB | self | |
| 3 | cpp z.c | P:100 | 150KB | pipe (1-1) | |
| 4 | cc1 -O | P:20 | 150KB | pipe (1-2) | |
| 5 | as>z.o | P:40 | 150KB | pipe (1-3) | |
| 6 | ld z.o x.o y.o -o a.out | <NONE> | | gang (1,2,3,4,5) | |

| host (13e-1) | Host name (13e-2) | user (13e-3) | CPU usage (13e-4) | Load av. (13e-5) | Speed (13e-6) |
|---|---|---|---|---|---|
| 1 | aaa | sumi | 0% | 0.0 | 1 |
| 2 | bbb |  | 0% | 0.0 | 1 |
| 3 | ccc |  | 0% | 0.0 | 1 |
| 4 | ddd |  | 30% | 0.3 | 2 |
| 5 | eee | sumi | 0% | 0.0 | 2 |

| Seq | Starting processing | Execution record data | File size | Execution mode | P.ID |
|---|---|---|---|---|---|
| 2 | cc -c y.c | ⟨NONE⟩ | 200KB | self | --- |
| 4 | ccl -O | P:20 | 150KB | pipe (1-2) | --- |
| 5 | as > z.o | P:40 | 150KB | pipe (1-3) | --- |
| 3 | cpp z.c | P:100 | 100KB | pipe (1-1) | --- |
| 1 | cc -c .c | ⟨NONE⟩ | 100KB | self | --- |
| 6 | ld z.o x.o y.o -o a.out | ⟨NONE⟩ | | gang(1,2,3,4,5) | --- |

FIG. 18(a)

| Host 1 | Host 2 | Host 3 | Host 4 | Host 5 |
|---|---|---|---|---|
| 0 | 0 | 0 | 0 | 0 |

FIG. 18(b)

| Host 1 | Host 2 | Host 3 | Host 4 | Host 5 |
|---|---|---|---|---|
| 0 | 0 | 0 | 0 | 100 KB |

FIG. 18(c)

| Host 1 | Host 2 | Host 3 | Host 4 | Host 5 |
|---|---|---|---|---|
| 0 | 0 | 0 | 107.1 KB | 100 KB |

FIG. 18(d)

| Host 1 | Host 2 | Host 3 | Host 4 | Host 5 |
|---|---|---|---|---|
| 100 KB | 150 KB | 100 KB | 107.1 KB | 100 KB |

FIG. 19

| host | 1 | 2 | 3 | 4 | 5 |
|---|---|---|---|---|---|
| Process | Seq 3 | Seq 5 | Seq 1 | Seq 4 | Seq 2<br>Seq 6 |

FIG. 20

| Seq | Execution record |
|---|---|
| 1 | T:10 |
| 2 | T:22 |
| 3 | P:100, T:2.52 |
| 4 | P:20, T:12.6 |
| 5 | P:40, T:6.3 |
| 6 | T:5 |

FIG. 23(a)

| 43a-1 | 43a-2 | 43a-3 | 43a-4 | 43a-5 | 43a-6 | 43a-7 | 43a-8 | 43a-9 |
|---|---|---|---|---|---|---|---|---|
| Day of week | Time | Usage $\eta$ | Probability of host breakdown $P_d$ | Stability $S_a$ | Remaining service time $T_s$ | Short-term prediction data | Long-term prediction data | Data valid time $T_e$ |
| | | | | | | | | |
| | | | | | | | | |
| | | | | | | | | |

FIG. 23(b)

Hardware information : CPU speed, Type of CPU, Memory capacity etc.

FIG. 24

| Data to be transmitted |
|---|
| Host name |
| Usage : $\eta$ |
| Host stability : $S_a$ |
| Probability of host breakdown : $P_d$ |
| Remaining service time : $T_s$ |
| Short-term prediction data |
| Long-term prediction data |
| Data valid time+1 : $T_e$ |
| Situation ID |
| Hardware information |

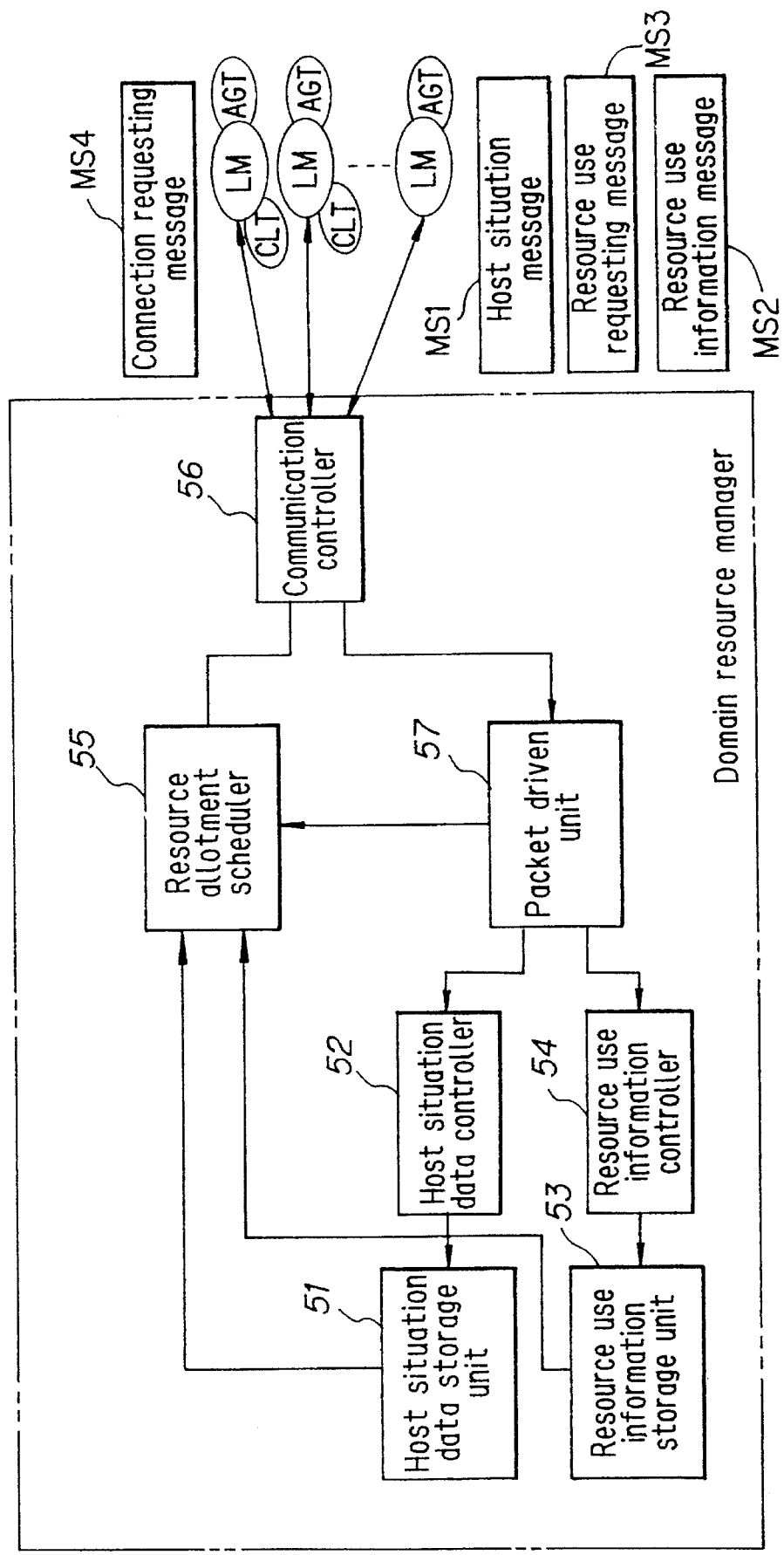

| Contents of resource use requesting message |
|---|
| Address : Request for allotment : Resource type |
| Amount : Host name : Port No. |

| Contents of connection requesting message |
|---|
| Address : Request for AGT connection |
| Resource type : Host name : Port No. |

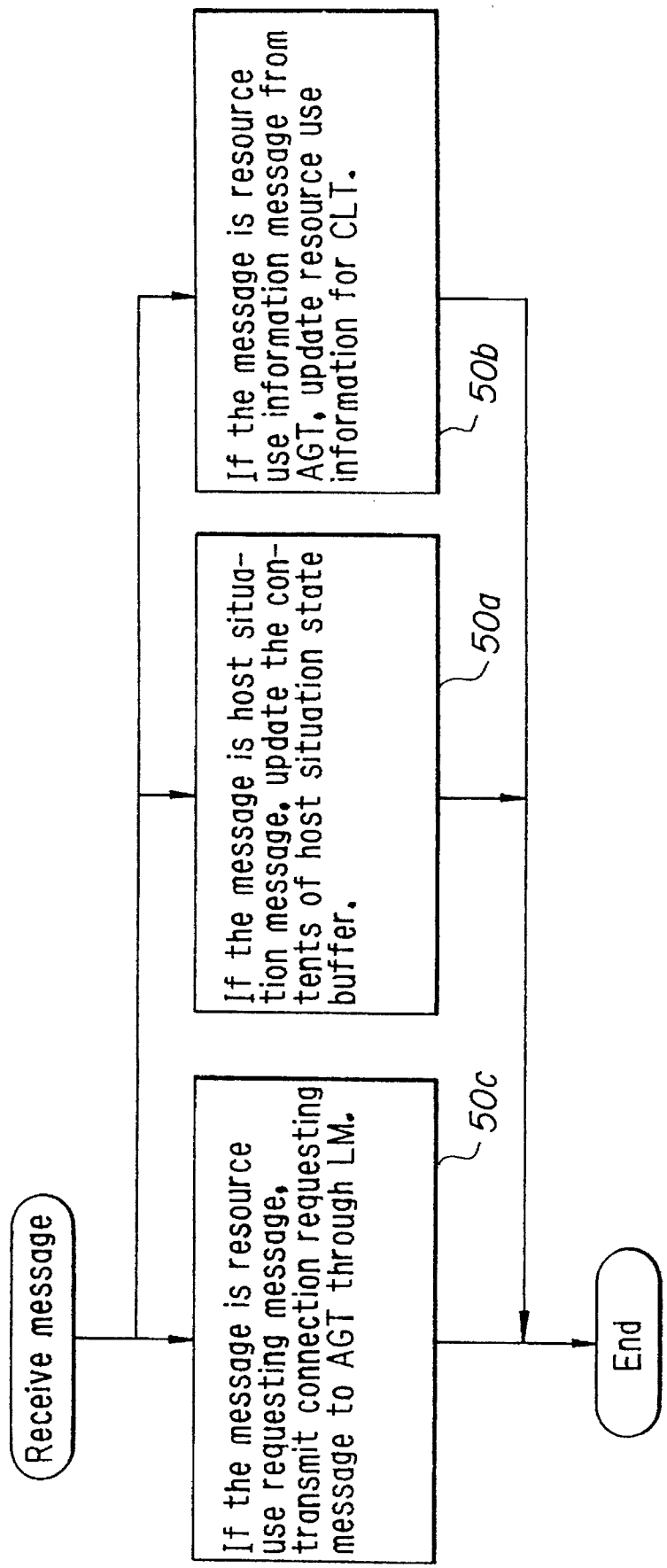

Resource use information of AGT — AGT1, AGTn
Connected host (port), Resource used, Amount, Time, Statistic amount

| Resource use token | |
|---|---|
| Token ID | |
| Resource situation | |
| Amount of usable resource | |
| Stability of resource | |
| Resource usable time limit | |
| Token valid time | |

COMPUTER RESOURCE DISTRIBUTING METHOD AND SYSTEM FOR DISTRIBUTING A MULTIPLICITY OF PROCESSES TO A PLURALITY OF COMPUTERS CONNECTED IN A NETWORK

This application is a continuation of application Ser. No. 08/032,866, filed Mar. 17, 1993, now abandoned.

BACKGROUND OF THE INVENTION

1. Field of the Invention

The present invention relates to computer resource distributing method and system and, more particularly, to computer resource distributing method and system for distributing processes to a plurality of computers which are connected in a network.

2. Description of the Related Art

A computer system is known in which processes and files are distributed to a multiplicity of computers which are connected in a network such as a LAN (Local Area Network) so that each computer executes the allotted process and controls the allotted file. In such a conventional computer system, the actual amount of processing and the actual processing time (CPU time) are hardly taken into consideration at the time of allotting processes to the computers, or even if they are taken into consideration, they are individually judged by the operator or the like. When processes are distributed to a multiplicity of computers, the CPU speed (processing speed) and the CPU usage (CPU load) of each computer are not taken into consideration, either. In addition, in most cases, when a plurality of processes which are different in the amount of processing per unit time are executed in parallel in a pipeline mode, the processes are executed in parallel by the respective computers to which the processes are distributed without taking the difference in the amount of processing per unit time into consideration. For this reason, it is impossible to uniformly allot processes to a multiplicity of computers, so that the throughput of the total system is lowered and it is impossible to obtain the result of processes in a short time.

Therefore there is a strong demand for a computer resource distributing system which enables a multiplicity of processes which are different in the amount of processing per unit time to be executed with efficiency in parallel by a multiplicity of computers having different processing times, and a computer resource distributing system which is capable of dynamically distributing a multiplicity of processes to a multiplicity of computer for the purpose of parallel processing with the CPU speed and the CPU usage of each computer taken into consideration.

In order to dynamically distribute a multiplicity of processes to a multiplicity of computers with the CPU speed and the CPU usage of each computer taken into consideration, it is necessary to inform the computer (server), which controls the distribution of the processes, about the situation of the CPU of each computer. As a method of supplying the data on the situations of the respective CPUs, the following three methods will be considered. A first method is a method of frequently supplying the data at a short interval of communication. A second method is a method of supplying the data at a long interval of communication, and a third method is a method of frequently supplying the data when the situation of a CPU is changing while supplying the data at a long interval when the situation of a CPU is stable. According to the first method, although the maintenance of the accurate data is possible, since the number of times of communication is large, the overhead bits for processing the received signals and the ratio of occupation of the communication path increase, there is a fear of lowering the communication efficiency of the other data. According to the second method, although the number of times of communication is reduced, it is impossible to detect a rapid change of the situation of a CPU. According to the third method, although the number of times of communication is reduced when the situation of each CPU is stable, when it is unstable, the number of times of communication inconveniently increases in the same way as in the first method.

In order to dynamically distribute a multiplicity of processes to a multiplicity of computers with the situation of the respective CPUs taken into consideration, it is necessary to take the following facts into consideration: (1) that the situations of the CPUs, including a breakdown of a host, dynamically change; (2) that a wide variety of computers are connected to each other; and (3) that there may be delay in transmitting the data on the situation of a CPU. When the situation of a CPU changes, it is impossible to secure a predetermined amount of resource in advance and it is difficult to collect the data on the situation of the CPU which changes with time. Therefore, there is a possibility that the situation of a CPU changes after a process is allotted to the CPU, so that the end of the processing is delayed. When a wide variety of computers are connected to each other, there is a great difference in performance among the CPUs or the like. In addition, it is difficult to collect the data on the situation of each computer, so that appropriate allotment of processes is impossible and there may be delay in executing the allotted process. When there is delay in supplying the data on the situation of a CPU, the same process may be allotted to a plurality of computers. In order to completely avoid this phenomenon, a synchronous process among all the CPUs is necessary, which makes the structure of the system complicated and raises the cost.

In the conventional computer system, however, the above-described facts (1) to (3) are not taken into consideration, so that it is difficult to collect accurate data on the situation of each computer and accurate allotment of processes is impossible.

SUMMARY OF THE INVENTION

Accordingly, it is an object of the present invention to eliminate the above-described problems in the related art and to provide a computer resource distributing method and system which are capable of distributing a multiplicity of processes, different in the amount of processing per unit time, to a multiplicity of computers having different processing times so as to be executed in parallel and with efficiency.

It is another object of the present invention to provide a computer resource distributing method and system which are capable of dynamically distributing a multiplicity of processes to a multiplicity of computers for the purpose of parallel processing with the CPU speed with the CPU usage of each computer taken into consideration It is still another object of the present invention to provide a computer resource distributing method and system which store data on the amount of processing or the like obtained by the actual execution of a process as the execution record data and distribute processes to a multiplicity of computers by using the execution record data.

It is a further object of the present invention to provide a computer resource distributing method and system which are capable of controlling the situation of each computer resource accurately by communicating a small number of times and distributing processes to a multiplicity of computers on the basis of the situation.

It is a still further object of the present invention to provide computer resource distributing method and system which are capable of efficiently distributing a plurality of computer resources whose situations change to a plurality of other computers which require the resources.

To achieve this aim, in a computer resource distributing method according to the present invention, a scheduler for distributing processes is provided in one computer and. If the amount of processing of each process is known, the scheduler allots the process having the largest amount of processing to a computer which has the smallest cumulative amount (initial value is 0) of processing and the amount of processing of the allotted process is added to the cumulative amount of processing, thereby updating the cumulative amount of processing of the computer. The scheduler then allots the process having the second largest amount of processing to a computer which has the second smallest cumulative amount of processing. In the same way, the processes are allotted to the other computers. In this way, it is possible to make the amount of processing by each computer uniform and to approximately simultaneously end the process by each computer. In other words, it is possible to increase the throughput of the computer system and to obtain the result of processes in a short time. If the amount of processing per unit time is used as the amount of processing, it is possible to make the usages a utilization rate of the CPUs uniform, which enables efficient parallel processing of a plurality of processes by a plurality of computers having different processing speeds. If the amount of processing is represented by the size of the file to be processed or the file processing speed, it is possible to select a predetermined value as the amount of processing at the time of distribution.

In a computer resource distributing method according to the present invention, the data on the amount of processing obtained by the actual execution of a process is stored as the execution record data, and the amount of processing in each process is obtained with reference to the execution record data. In this way, it is possible to obtain the accurate amount of processing, thereby enhancing the uniformity of the amount of processing in each computer and increasing the throughput of the computer system.

In addition, in a computer resource distributing method according to the present invention, the cumulative amount of processing of a computer is updated by adding the value obtained by dividing the amount of processing by the computer by the CPU speed to the cumulative amount of the computer, and processes are distributed on the basis of the updated cumulative amount of processing. In this way, it is possible to uniformly distribute processes with the processing speed of each computer taken into consideration, thereby further increasing the throughput of the system. In this case, if the CPU speed is corrected on the basis of the load of the computer, it is possible to further enhance the uniformity of processes.

In a computer resource distributing method according to the present invention, each computer supplies situation data such as the resource usage together with the data indicating the reliability of the situation data to the computer (server) which controls the distribution of computer resources. On the basis of the situation data and the reliability data, the server distributes processes to computers or allots usable computers to a client which distributes processes. In this case, each computer increases the reliability when the change of the situation is small, and decreases the reliability when the change of the situation is large. When the reliability is high, the interval of transmission of the situation data is prolonged, while it is shortened when the reliability is low. In this way, it is possible to accurately control the situation of each computer resource by a low frequency of communication, thereby enabling the efficient allotment of a computer resource.

Furthermore, in a computer resource distributing method according to the present invention, each computer supplies situation data together with hardware information such as the CPU speed to the server. On the basis of the situation, the reliability of the resource and the hardware information of each computer, the server distributes processes to computers resources or allots preselected computers to the client. In this way, distribution corresponding to the performance of each computer is enabled, thereby increasing the throughput of the computer system.

In a computer resource distributing method according to the present invention, a resource use permitting mechanism (agent) for supplying a token or message which allows the exclusive use of a computer resource is provided in a computer. The agent establishes a connection with a predetermined client which requests the use of a computer resource, and supplies a computer resource use token to the client for the purpose of the exclusive allotment of the computer resource to the client. In this way, by allotting a resource by using the resource use token, it is possible to allot a plurality of resources serially and efficiently without a fear of the same resource being allotted to different clients.

In addition, in a computer resource distributing method according to the present invention, the agent compares the situation of a computer resource when the agent has received a processing asking message from a client with the situation of the computer resource when the agent supplies a token, and if there is a change in the situation, the agent rejects the processing asking message. In this way, it is possible to efficiently allot a plurality of computer resources whose situation change to a plurality of clients.

Furthermore, in a computer resource distributing method according to the present invention, when a client detects a breaking of the connection, distribution is carried out except for the computer resource with which the connection has been cut. In this way, it is possible to correspond to a unilateral rejection due to a breakdown of a computer or by a computer resource.

Other features and advantages of the present invention will be apparent from the following description taken in conjunction with the accompanying drawings.

BRIEF DESCRIPTION OF THE DRAWINGS

FIGS. 2(A) and 2(B) are a second and third schematic explanatory views of the present invention;

FIG. 12 shows the structure of a process table;

FIG. 13 is a first explanatory view of a process table in compiling processing;

FIG. 14 is an explanatory view of a record data table;

FIG. 15 is a second explanatory view of a process table in compiling processing;

FIG. 16 is an explanatory view of a distribution processing host table;

FIG. 17 is an explanatory view of sorting of processes;

FIG. 18(a)–(d) are explanatory views of a cumulative amount table;

FIG. 19 is an explanatory view of a host.process mapping table;

FIG. 20 is an explanatory view of the record data table after the execution of the processes;

FIGS. 23(a) and 23(b) are explanatory views of the contents of a resource situation buffer;

FIG. 24 is an explanatory view of the data transmitted to a domain resource manager DM;

FIG. 27 shows the structure of the domain resource manager DM;

FIGS. 28(a) and 28(b) are explanatory views of a message;

FIG. 29 shows the processing flow of the domain resource manager DM as a whole;

DESCRIPTION OF THE PREFERRED EMBODIMENTS (a) Schematic Explanation of the Invention FIGS. 1 and 2 are schematic explanatory views of the present invention.

In FIG. 1, the reference numeral 11 represents a group of processes to be executed, 13 a process allotting device (scheduler) for allotting a plurality of processes to a plurality of computers and 30 a group of computers (CPUs). The reference numerals 11a, 11b, 11c . . . represent processes to be executed, and 31 to 36 computers (CPUs).

The scheduler 13 for distributing processes is provided in at least one computer, and if the amounts of processing of the processes 11a to 11g are known, the scheduler 13 allots the process having the largest amount of processing to a computer (e.g., 31) which has the smallest cumulative amount (initial value is 0) of processing. The amount of processing of the allotted process is then added to the cumulative amount of processing, thereby updating the cumulative amount of processing of the computer 31. The scheduler 13 then allots the process having the second largest amount of processing to a computer (e.g., 32) which has the second smallest cumulative amount of processing. In the same way, the processes are serially allotted to the other computers (e.g., 33 to 36). In this way, it is possible to make the amount of processing by each computer approximately uniform and to approximately simultaneously end the process by each computer. In addition, it is possible to enhance the efficiently of a computer system and to obtain the result of processes in a short time.

Figure 2:
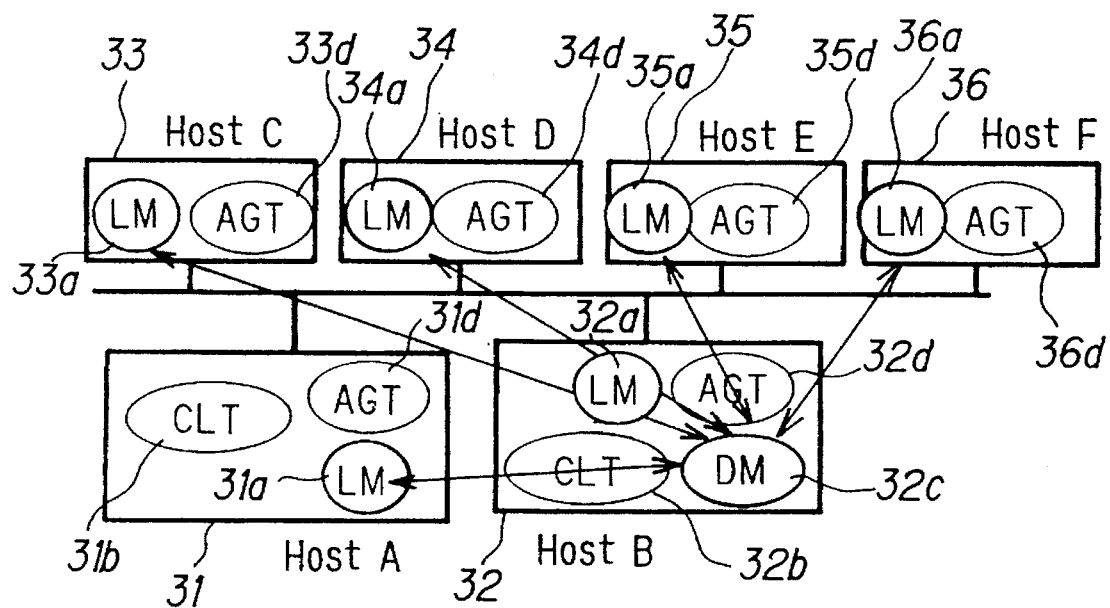
Figure 2:
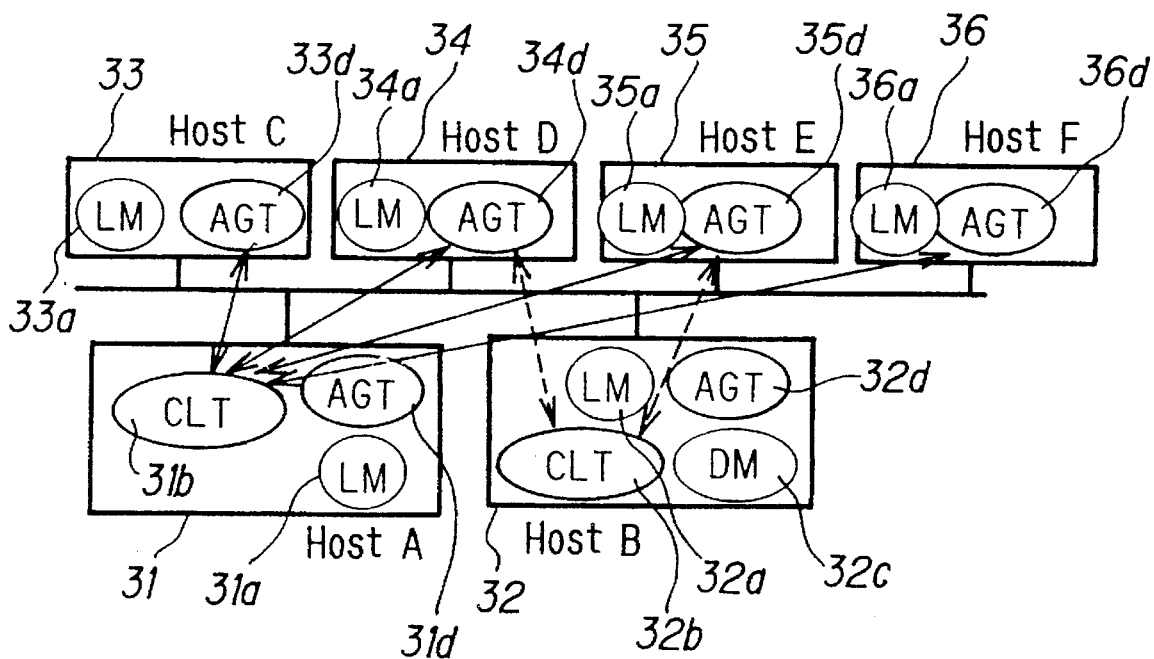

In FIG. 2, the reference numerals 31 to 36 represent a plurality of computers (host A to host F) which are connected in a network; 31a to 36a represent local resource managers (LMs) provided in the respective computers so as to monitor the operational states thereof; 31b to 32b represent clients (CLTs), each of which requests computers usable for process distribution and executes distribution of processes by using the allotted computers; 32c represents a server (referred to "domain resource manager DM" hereinafter) which holds the data on the operational state of each computer and determines the usable computers when a client CLT requests computer resources; and 31d to 36d each represent a resource use permitting mechanism (referred to as "agent or AGT" hereinafter) for supplying a message (token) which permits the exclusive use of a computer resource to the client CLT which is designated by the domain resource manager DM.

Figure 1:
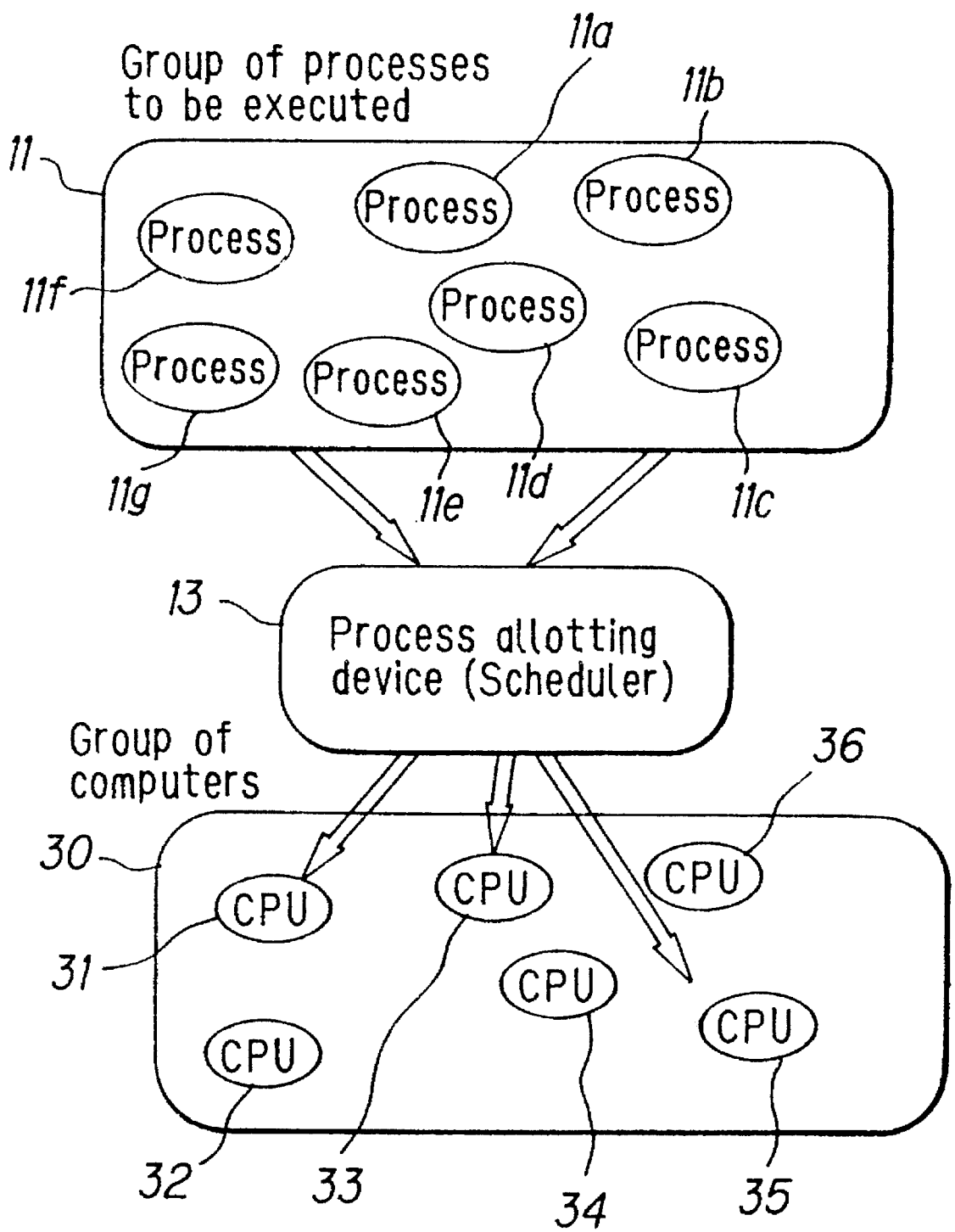
FIG. 1 is a first schematic explanatory view of the present invention.

The computers which are usable for the distribution of processes by a client is determined as follows. (See FIG. 2(a).) The local resource managers LMs 31a to 36s of the respective computers transmit the situation data which indicate the CPU usage or the like together with the data on the reliability of the situation data to the domain resource manager DM 32c. When the domain resource manager DM 32c receives a request for the allotment of computers which are usable for the distribution of processes from the client 31b (which corresponds to the scheduler 13 in FIG. 1), the domain resource manager DM 32c determines at least two computers which are usable for the distribution with the usage and the reliability of each computer taken into consideration. For example, computers are selected in order of capacity and reliability. The client 31b distributes the processes to the usable computers in the manner explained in FIG. 1. In this case, each of the local resource managers LM 31a to 36a of the respective computers increases the reliability (stability, data valid time) when the change of the situation is small, and decreases the reliability when the change of the situation is large. When the reliability is high, the local resource manager LM prolongs the interval of transmission of the situation data, and shortens the interval when the reliability is low.

In this way, the domain manager DM can accurately control the situation of each computer resource by a low frequency of communication, thereby enabling effective allotment of computer resources. The local resource managers LM 31a to 36a of the respective computers transmit the hardware information of the respective computers together with the situation data to the domain resource manager DM 32c, and the domain resource manager DM 32c allots at least two computers to the client 31b on the basis of the situation data, the reliability and the hardware of each computer. In this way, it is possible to allot computers in accordance with the performance, thereby enabling uniform distribution and increasing the throughput of the system.

In order that the client 31b can actually ask the usable computers 33 to 36 to execute the processes, it is necessary to obtain permission for use from the respective computers. The procedure for obtaining the permission for use is as follows.

When the domain resource manager DM 32c determines the usable computers 33 to 36 in answer to the request for computer resources from the client 31b, the domain resource manager DM 32c instructs the agents 33d to 36d of the respective computers to answer the request for the execution of the processes from the client 31b (FIG. 2(a)). Under the instructions of the DM 32c each of the agents 33d to 36d establishes a connection with the client 31b which requests the use of computer resources (FIG. 2(b)), and supplies a resource use token to the client 31b for the purpose of the exclusive allotment of the computer resource to the client 31b. In this way, the client 31b can exclusively use the computers which have supplied the tokens. The resource use token includes the data on the situation of the resource, the amount of usable resource, the stability of the resource and the resource usable time limit, and the client 31b distributes the processes to the plurality of computers on the basis of these data under the control shown in FIG. 1.

When a plurality of clients (e.g., 31b and 32b) request the use of computer resources, each agent establishes connection with each of the clients 31b and 32b. Each agent first supplies a resource use token only to one predetermined client (e.g., 31b) so as to allow the client 31b the exclusive use of the computer resource and after the end of the use of the computer resource by the client 31b, each agent supplies a resource use token to the next client (e.g., 32b) so as to allow the client 32b the exclusive use of the computer resource. In this way, it is possible to efficiently allot a plurality of resources whose situation change to other plurality of computers which request the use of the resources.

(b) Structure of the Entire Part of the Invention

Figure 3:
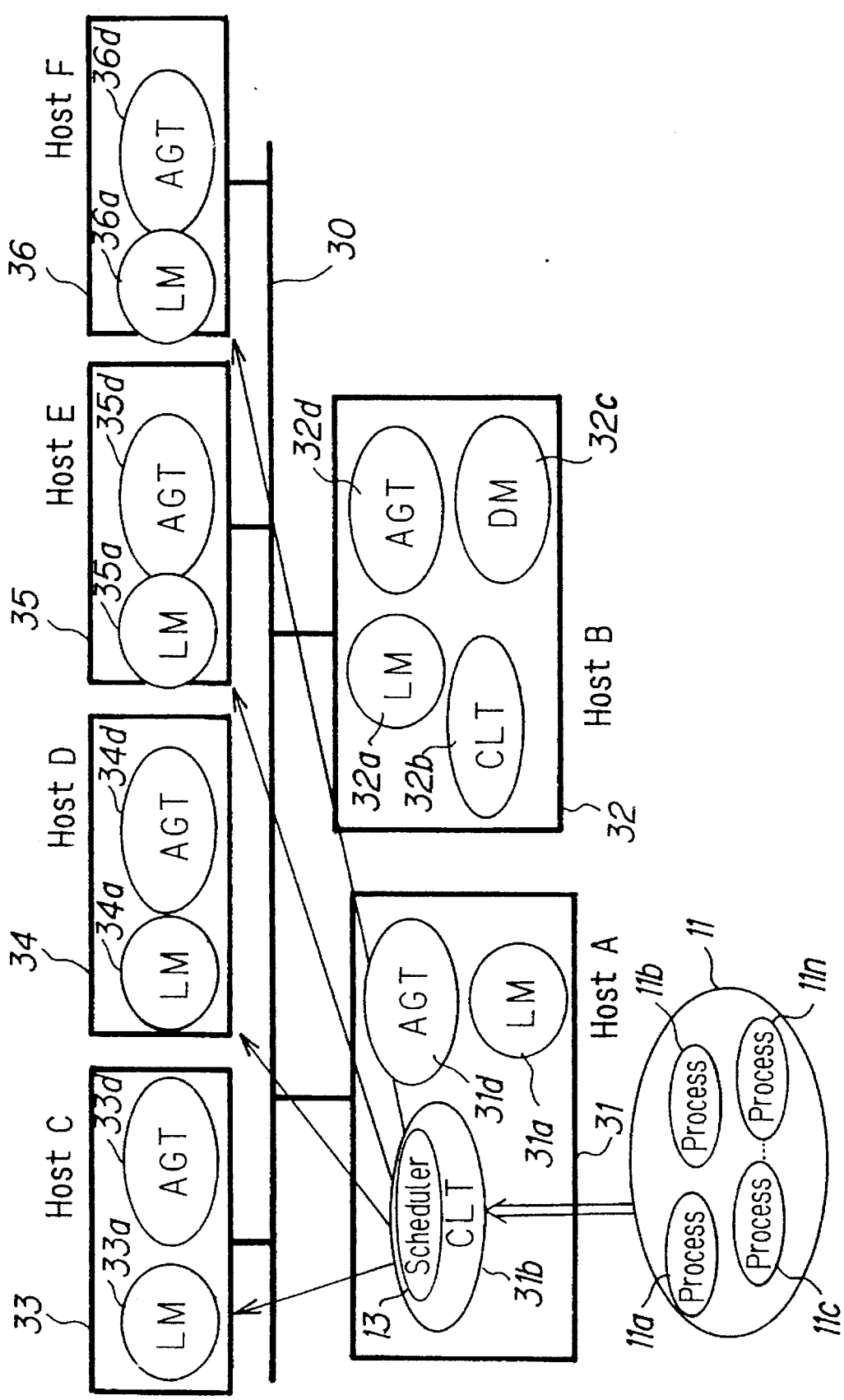
FIG. 3 shows the structure of the entire part of the present invention.

FIG. 3 shows the structure of the entire part of the present invention. In FIG. 3, the reference numeral 11 represents a group of processes to be executed, 30 a communication network such as a LAN (Local Area Network), and 31 to 36 a plurality of computers (host A to host F) connected in the network. In the respective computers 31 to 36, the reference numerals 31a to 36a represent local resource managers (LMs); 31b and 32b represent clients (CLTs), each of which requests computer usable for process distribution and executes distribution of processes 11 by using the allotted computers; 32c represents a server (domain resource manager DM) which holds the data on the operational situation such as the usage of each computer and determines the usable computers when a client CLT requests computer resources; and 31d to 36d, represent a resource use permitting mechanism (agent) for supplying a resource use token to the client CLT which is designated by the domain resource manager DM so as to permit the exclusive use of the resource of their own computers.

(1) Distribution of Processes

In order that the client 31b distribute the group 11 of processes to remote computers and ask them for the execution of the processes, it is necessary to obtain permission for use from the remote computers. The procedure for obtaining the permission for use will be described later. It is now assumed that the permission for use is obtained from a plurality of computers 33 to 36.

If the amounts of processing of the processes 11a to 11n are known, the scheduler 13 in the client 31b allots the process having the largest amount of processing to a computer (e.g., 33) which has the smallest cumulative amount (initial value is 0) of processing. The amount of processing of the allotted process is added to the cumulative amount of processing, thereby updating the cumulative amount of processing of the computer 33. The scheduler 13 then allots the process having the second largest amount of processing to a computer (e.g, 34) which has the second smallest cumulative amount of processing. In the same way, all the processes 11a to 11n are serially allotted to the other computers (35 and 36).

Figure 4:
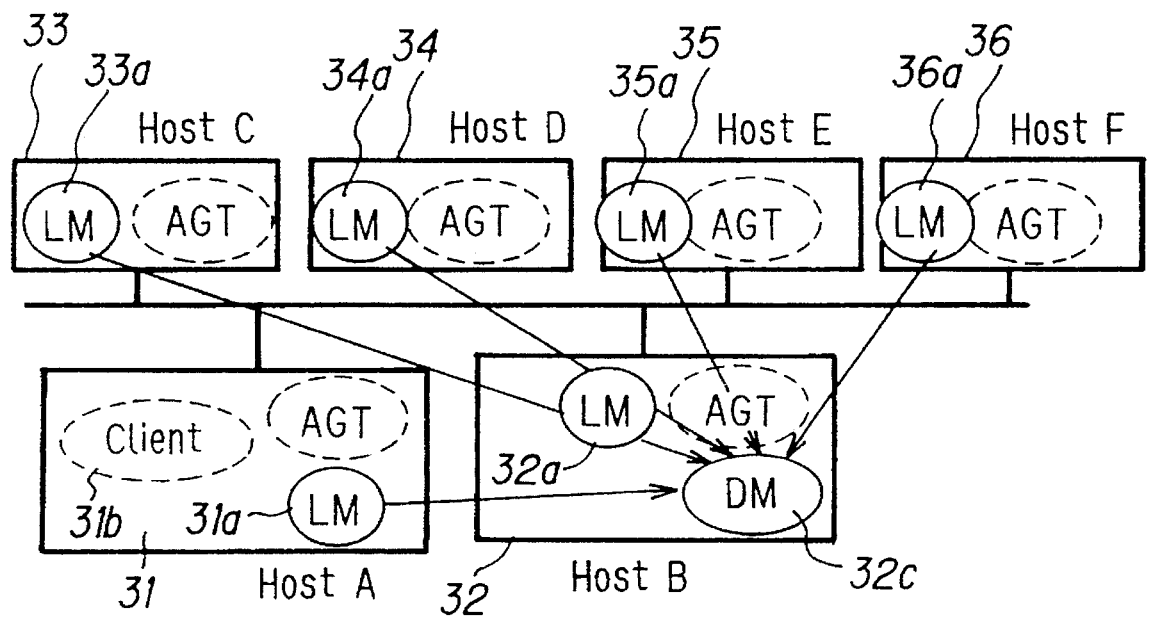
FIG. 4 explains the collection of the situation data of computers.
Figure 5:
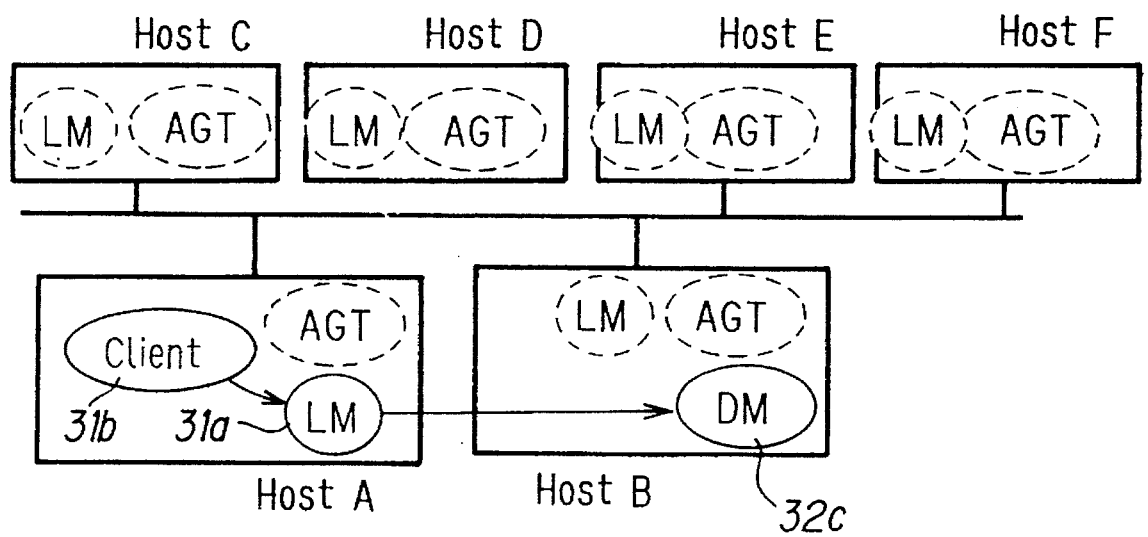
FIG. 5 explains the request of a computer for use of computer resources.
Figure 6:
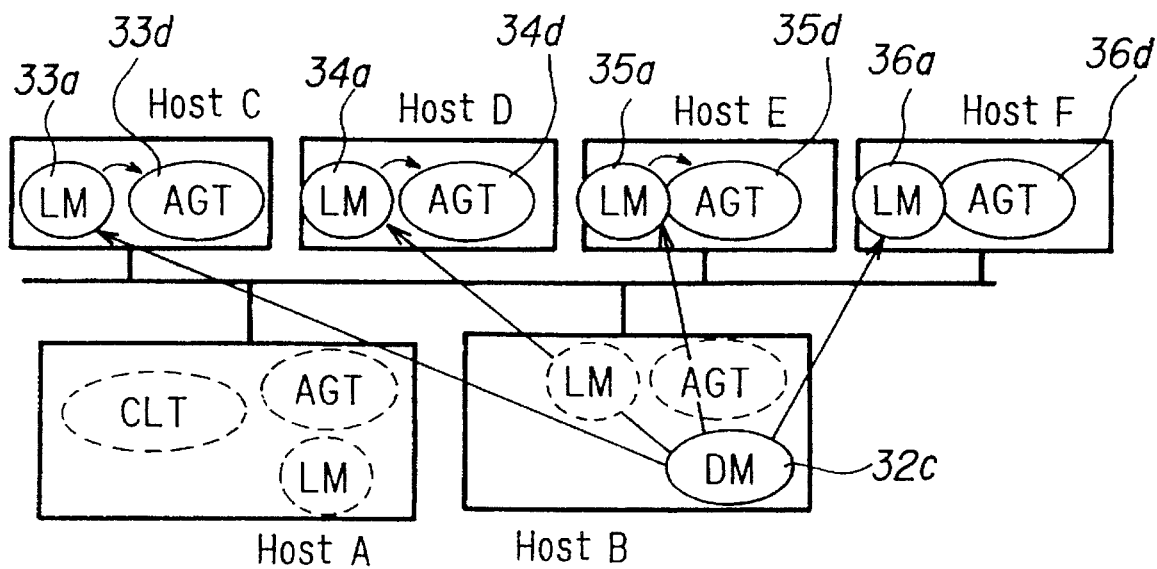
FIG. 6 is a first explanatory view of the permission for use of computer resources.

(2) Determination of a Usable Computer (FIGS. 4 to 6)

The computers which are usable for the distribution of processes by a client are determined as follows.

The local resource managers LMs 31a to 36a of the respective computers monitor the situations (e.g., the usage) of their own CPUs and transmit the situation data, with the data on the reliability of the situation data added thereto, to the domain resource manager DM 32c (FIG. 4). When the DM 32c receives a request for computers which are usable for the distribution of processes from the client 31b through the local resource manager LM 31a (FIG. 5), the domain resource manager DM 32c determines at least two computers which are usable for the distribution with the usage and the reliability of each of the computers 31 to 36 taken into consideration. For example, computers 33 to 36 are selected in order of capacity and reliability as the usable computers. The client 31b distributes the processes to the usable computers 33 to 36 in the manner explained in FIG. 3. For the reliability, for example, the stability and the data valid time are utilized.

(3) Permission for Use of Computer Resources

In order that the client 31b can actually ask the usable computers 33 to 36 to execute the processes, it is necessary to obtain permission for use from the respective computers 33 to 36 which are determined by the domain resource manager DM 32c. The procedure for obtaining the permission for use is as follows.

Figure 7:
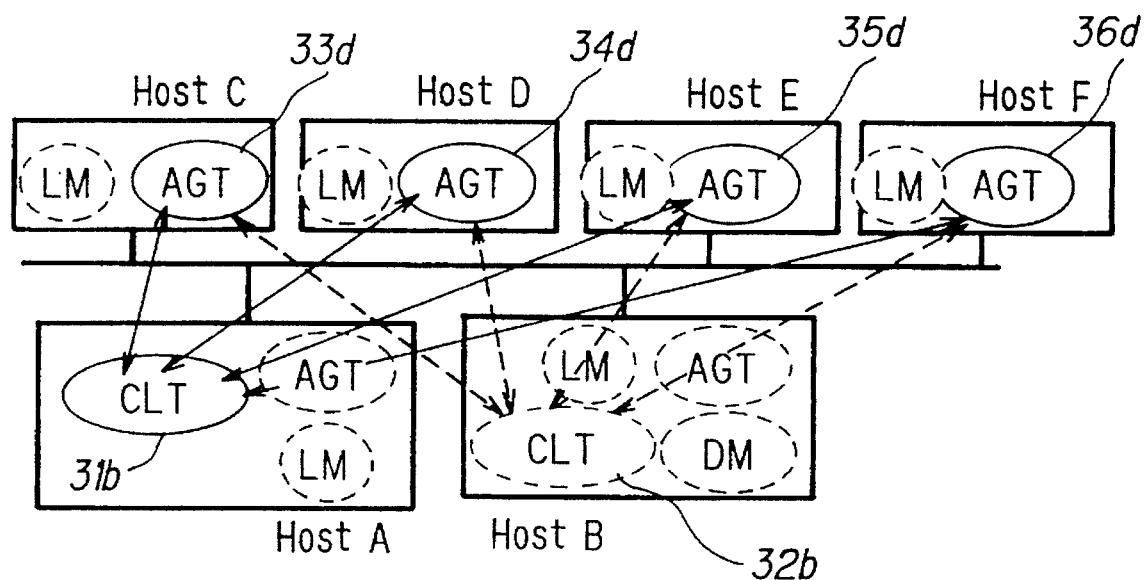
FIG. 7 is a second explanatory view of the permission for use of computer resources.

When the domain resource manager DM 32c determines the usable computers 33 to 36, in answer to the request for a computer resource from the client 31b, the DM 32c instructs the agents 33d to 36d of the respective computers to answer the request for the execution of the processes from the client 31b through the respective local managers LMs (FIG. 6). Under the instructions of the DM 32c, each of the agents 33d to 36d establishes a connection with the client 31b which requests the use of computer resources (FIG. 7), and supplies a resource use token to the client 31b for the purpose of the exclusive allotment of the computer resource to the client 31b. The resource use token includes the situation data of the resource, the amount of usable resource, the stability of the resource and the resource usable time limit, and the client 31b distributes the processes to the plurality of computers on the basis of these data in the manner shown in FIG. 3. In this way, it is possible to efficiently allot a plurality of resources whose situation change to other plurality of computers which request the use of the resources.

When a plurality of clients (e.g., 31b and 32b) request the use of computer resources, each of the agents 33d to 36d establishes a connection with each of the clients 31b and 32b. Each agent first supplies a resource use token only to one predetermined client (e.g., 31b) so as to allow the client 31b the exclusive use of the computer resource and after the end of the use of the computer resource by the client 31b, each agent supplies a resource use token to the next client (e.g., 32b) so as to allow the client 32b the exclusive use of the computer resource.

(c) Control of the Distribution of Processes

Structure of the Distribution Control

Figure 8:
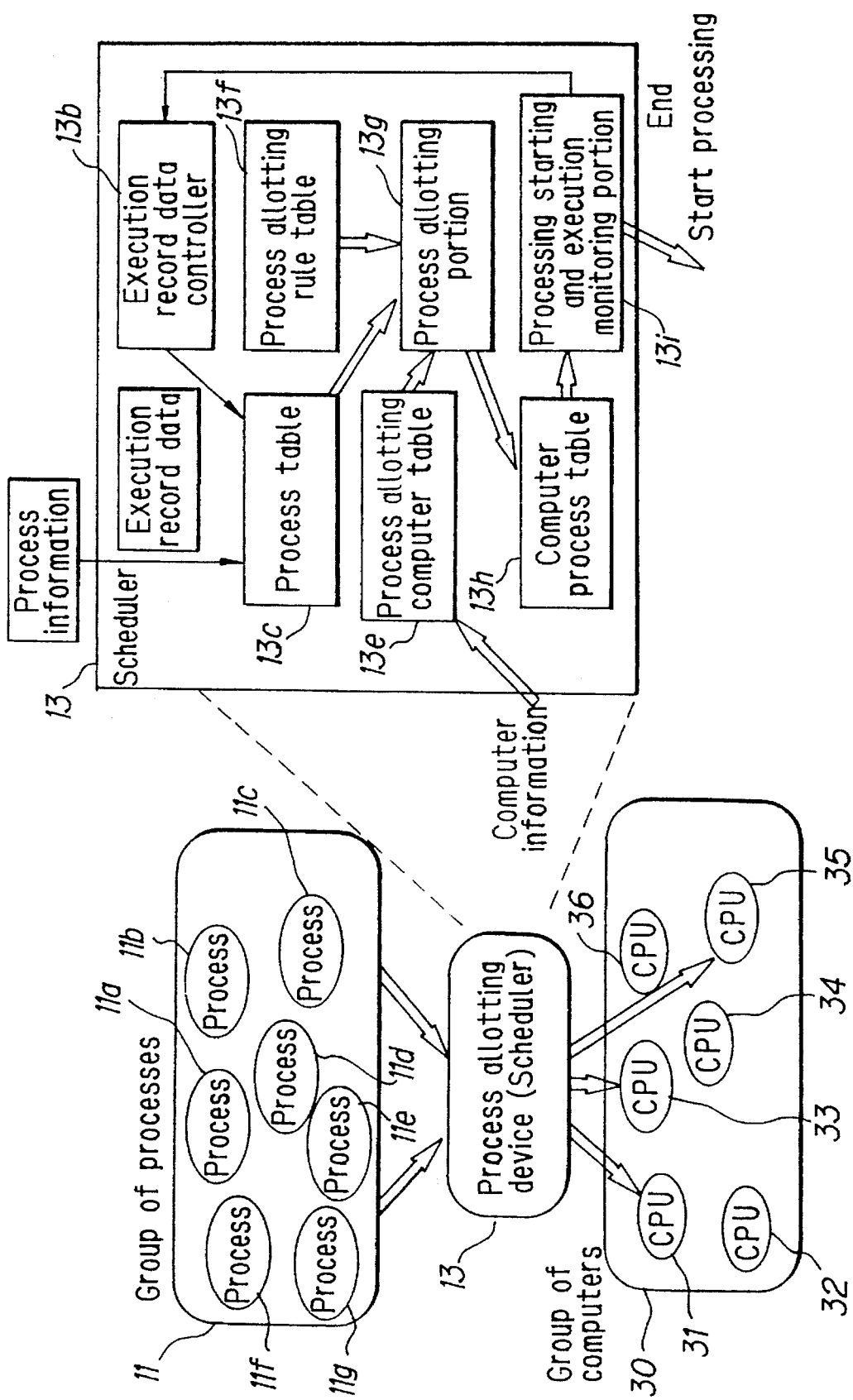
FIG. 8 shows the structure of an example of the control of the distribution of processes in the present invention.

FIG. 8 shows the structure of an example of the control of the distribution of processes in the present invention. In FIG. 8, the reference numeral 11 represents a group of processes to be executed; 13 a process allotting device (scheduler) for allotting a plurality of processes to a plurality of computers, which is included in the client 31b shown in FIG. 3; and 30 a group of computers. In the group 11 of processes, the reference numerals 11a to 11g represent processes to be executed by computers and 31 to 36 computers (CPUs or hosts) which are connected in a network such as a LAN.

In the scheduler 13, the reference numeral 13b represents an execution record data controller for controlling the execution record data on the amount of processing of each of the processes 11a to 11g to be actually executed the reference numeral 13c represents a process table for storing the data on the procedure for processing the processes 11a to 11g and the amounts of processing thereof; 13e a process allotting computer table for storing the data on the computer for allotting the processes such as the CPU speed (processing speed) $V_{cpu}$ and the CPU load (usage) $\eta$; 13f a process allotting rule table for storing the procedure for actually allotting the processes to the computers; 13g a process allotting portion for allotting the processes to the computers 31 to 36 on the basis of the data supplied from each table; 13h a computer.process table for storing the correspondence of the computers to the processes which is created by the process allotting portion 13g; and 13i a processing starting and execution monitoring portion for allotting the processes to the computers in accordance with the contents of the computer.process table 13h and monitoring the end of the executions of the processes.

The processing starting and execution monitoring portion 13i monitors the time (processing time) elapsed from the starting of the processing to the end thereof, the amount of processing (the number of steps of processing) or the amount of processing per unit time (amount of processing/processing time) which is transmitted from each computer. The processing starting and execution monitoring portion 13i and supplies these data to the execution record data controller 13b as the execution record data after the end of processing so as to be stored in the execution record data controller 13b in correspondence with the name of each process. The process table 13c stores the data on the procedure for processing the processes and the amounts of processing on the basis of the process information and the record in formation.

Method of Allotting Processes

The process allotting portion 13g allots the processes to the computers in accordance with an allotment algorithm which is designated by the processing allotting rule table 13f on the basis of the contents (amount of processing, CPU speed, load, etc.) of the process allotting computer table 13e. As the method of allotting the processes, the following methods (1) to (6) are considered.

(1) When the amounts of processing of the processes 11a, 11b, 11c, . . . are known, the processes are arranged in order of amount of processing, and the process having the largest amount of processing is allotted to a computer which has the smallest cumulative amount (initial value is 0) of processing of all the amounts of processing which are stored in correspondence with the computers 31, 32, 33 . . . . The amount of processing of the allotted process is added to the cumulative amount of processing, thereby updating the cumulative amount of processing of the computer to which the process is allotted. The process having the second largest amount of processing is then allotted to a computer which has the second smallest cumulative amount of processing and the cumulative amount of processing of the computer updated. In the same way, the processes are serially allotted to the other computers, and the correspondence of the computers to the processes is stored in the computer.process table 13h. According to this method, it is possible to allot the processes so that the amount of processing is uniform in each computer and therefore, to end the processings at the same time or approximately the same time. For the amount of processing, the number of steps of processing or the processing time is utilized, for example.

(2) When the amount of processing per unit time (amount of processing/processing time) of each process is known from measurement or calculation, the processes 11a, 11b, 11c, . . . are arranged in order of amount of processing per unit time. The process having the largest amount of processing per unit time is allotted to a computer which has the smallest cumulative amount (initial value is 0) of processing of all the amounts of processing which are stored in correspondence with the computers 31, 32, 33 . . . . The amount of processing of the allotted process is added to the cumulative amount of processing, thereby updating the cumulative amount of processing of the computer to which the process is allotted. The process having the second largest amount of processing per unit time is then allotted to a computer which has the second smallest cumulative amount of processing and the cumulative amount of processing is updated. In the same way, the processes are serially allotted to the other computers and the respective cumulative amount of processing are updated. According to this method, it is possible to make the CPU load (usage) of each computer uniform.

The usage $\eta$ is obtained from the following formula (a):

$$\eta = (Tu + To) \cdot 100/T (\%) \quad \text{(a)}$$

wherein Tu is the time for which a user (application program) uses during a certain time T, and To is the time for which an OS (operation system) of the computer uses. The usage η is supplied to the scheduler 13 as the computer information from the OS of each computer.

(3) In the case of processing files, the processes 11a, 11b, 11c, . . . are arranged in order of size of the file, and the process having the largest file size is allotted to a computer which has the smallest cumulative file size (initial value is 0) of all the file sizes which are stored in correspondence with the computers 31, 32, 33 . . . . . The file size of the allotted process is added to the cumulative file size, thereby updating the cumulative file size of the computer to which the process is allotted. The process having the second largest file size is then allotted to a computer which has the second smallest cumulative file size and the cumulative file size is updated. In the same way, the processes are serially allotted to the other computers and the respective cumulative file sizes are updated. This method uses the file size as the standard for judging the amount of processing because the amount of processing corresponds to the file size.

(4) The processes are first allotted and executed by another method. The processing time, the amount of processing (number of steps of processing, etc.) or the amount of processing per unit time (amount of processing/processing time) of each of the processes 11a, 11b, 11c . . . which is obtained from the actual execution of the processes is monitored by the processing starting and execution monitoring portion 13i. The processing starting and execution monitoring portion 13i supplies the data to the execution record data controller 13b as the execution record data after the end of processing so as to be stored in the execution record data controller 13b in correspondence with the name of each process. If the allotment of the processes is required thereafter, the process table 13c is created from the amount of processing of each process by using the execution record data, and the process allotting portion 13g allots the processes to the computers 31, 32, 33 . . . on the basis of the amount of processing by the method (1) or (2). According to this method, since the actual amount of processing is known, it is possible to further enhance the uniformity of the amount of processing by each computer and the uniformity of the usage of each computer.

(5) When the processing speed is different among the computers in a computer system, the processes 11a, 11b, 11c, . . . are arranged in order of amount of processing, amount of processing per unit time or file size. The process having the largest amount of processing or the like is allotted to a computer which has the smallest cumulative amount (initial value is 0) of processing of all the amounts of processing which are stored in correspondence with the computers 31, 32, 33 . . . in the same way as in the methods (1) to (4). The value obtained by dividing the amount of processing, the amount of processing per unit time or the file size by the CPU speed (processing speed) $V_{cpu}$ of the computer is then added to the cumulative amount of processing, thereby updating the cumulative amount of processing of the computer to which the process is allotted. In the same way, the allotment is serially repeated so as to allot the processes to the other computers. According to this method, it is possible to uniformly distribute the processes with the processing speed of each computer taken into consideration. The CPU speed is supplied from each computer to the scheduler 13 in advance as the computer information.

(6) In the method (5), the CPU speed $V_{cpu}$ of the computer is corrected on the basis of the load of the computer, and the effective CPU speed $V_{eff}$ obtained by the correction is used for the update of the cumulative value. According to this method, since the CPU speed $V_{cpu}$ of a computer is corrected on the basis of the load of the computer, it is possible to further enhance the uniformity of processes in comparison with the method 5. The effective CPU speed is calculated from the following formula (b):

$$V_{eff}=(100-\eta)\cdot V_{cpu}/100 \qquad (b)$$

The scheduler 13 is therefore capable of calculating the effective CPU speed $V_{eff}$ from the formula (b) by using the load η and the CPU speed $V_{cpu}$ which are input from each computer as the computer information at a predetermined interval of time.

The methods (1) to (6) are utilized, for example, as follows.

(1) The method (3) is utilized for the processing of files.
(2) The method (1) is utilized when the amount of processing is known in advance.
(3) The method (2) is utilized for a pipeline processing which uses a plurality of computers.
(4) The method (4) is utilized for the processings which have once been executed.
(5) The method (5) is utilized in a system which uses computers having different processing speeds.
(6) The method (6) is utilized when a computer executes another process in parallel.

In this way, effective distribution of processes, namely, scheduling processing is realized.

Embodiment Applied to Compiling Processes

Figure 9:
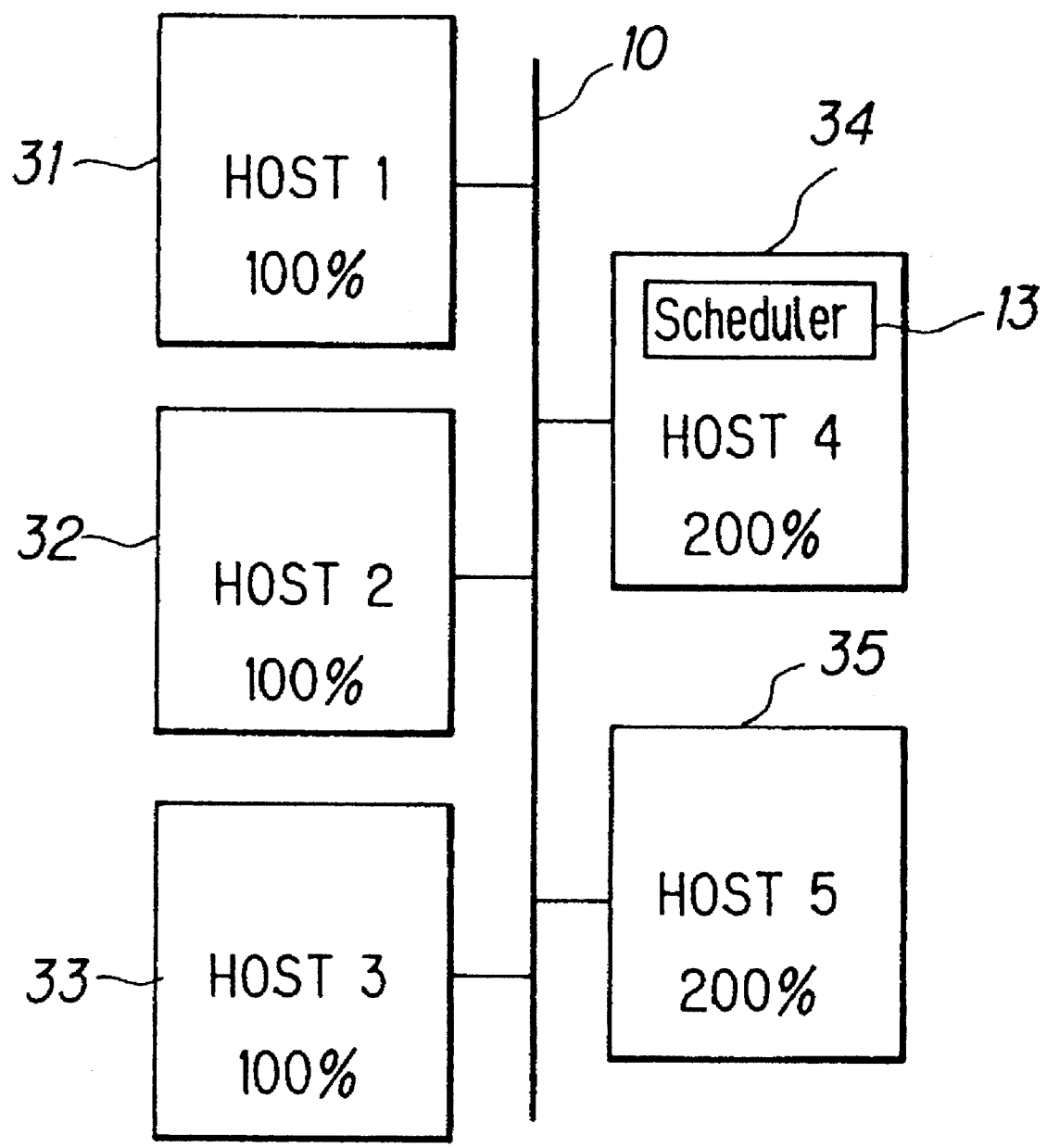
FIG. 9 shows the structure of a computer system.

FIG. 9 shows the structure of a computer system for distributing compiling processes. In FIG. 9, the reference numeral 10 represents a network such as a LAN, and 31 to 35 computers (referred to as "host 1 to host 5" hereinafter) which are connected in the network and are operated on UNIX. The CPU speed of each of the hosts 1 to 3 is 100% (normalized as "1") and the CPU speed of each of the hosts 4 and 5 is 200% (normalized as "2"). A scheduler 13 is mounted on one host (e.g., host 4) among these hosts. It is assumed that the computers 31 to 35 are already permitted to be used for the distribution of processes.

Compiling Apparatus

Figure 10:
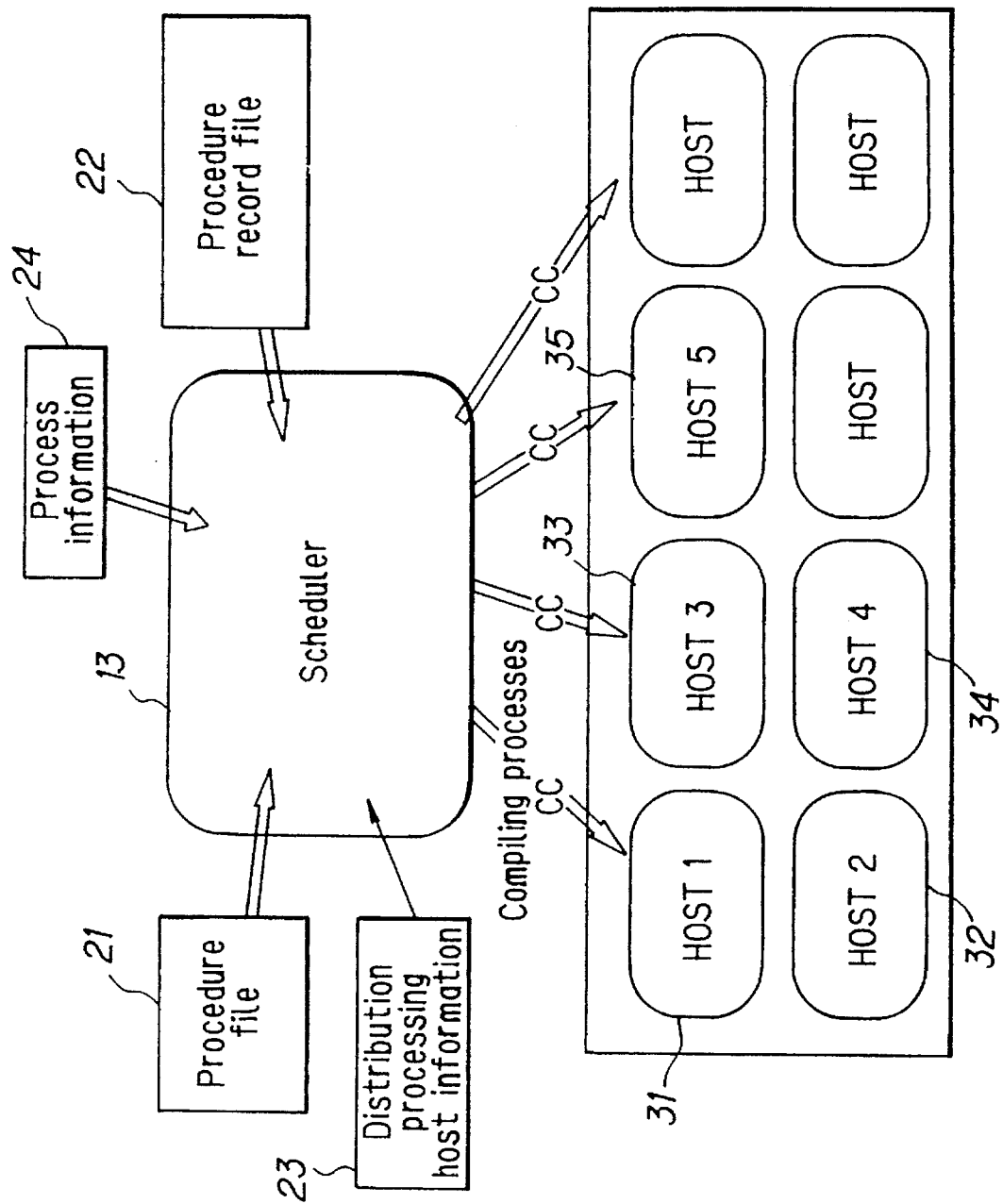
FIG. 10 shows the structure of a compiling apparatus.

FIG. 10 shows the structure of a compiler for distributing compiling processes in the computer system shown in FIG. 9. This compiling apparatus produces several compiling commands from a file in which the compiling procedure for a program is written, and distributes processes corresponding to each compiling command to a plurality of hosts in a network so as to be executed in parallel, thereby increasing the compiling processing speed.

In FIG. 10, the reference numerals 31 to 35 represent computers (host 1 to host 5) 13 a scheduler 21 a procedure file in which the compiling procedure for a program is written; 22 an execution record data file for storing the amount of processing, the processing time and the amount of processing per unit time of the processes which have been executed as the execution record data; 23 computer information (distribution processing host information) including the CPU speed $V_{cpu}$ and the load η which are input from a host to the scheduler 13; and 24 process information including the names and the sizes of the files to be processed. The scheduler 13 allots the processes to the host 1 to host 5 in accordance with the compiling command with reference to the procedure file 21, the execution record data file 22 and the distribution processing host information 23, and commands the hosts to start compiling processings in parallel with each other.

Scheduler

Figure 11:
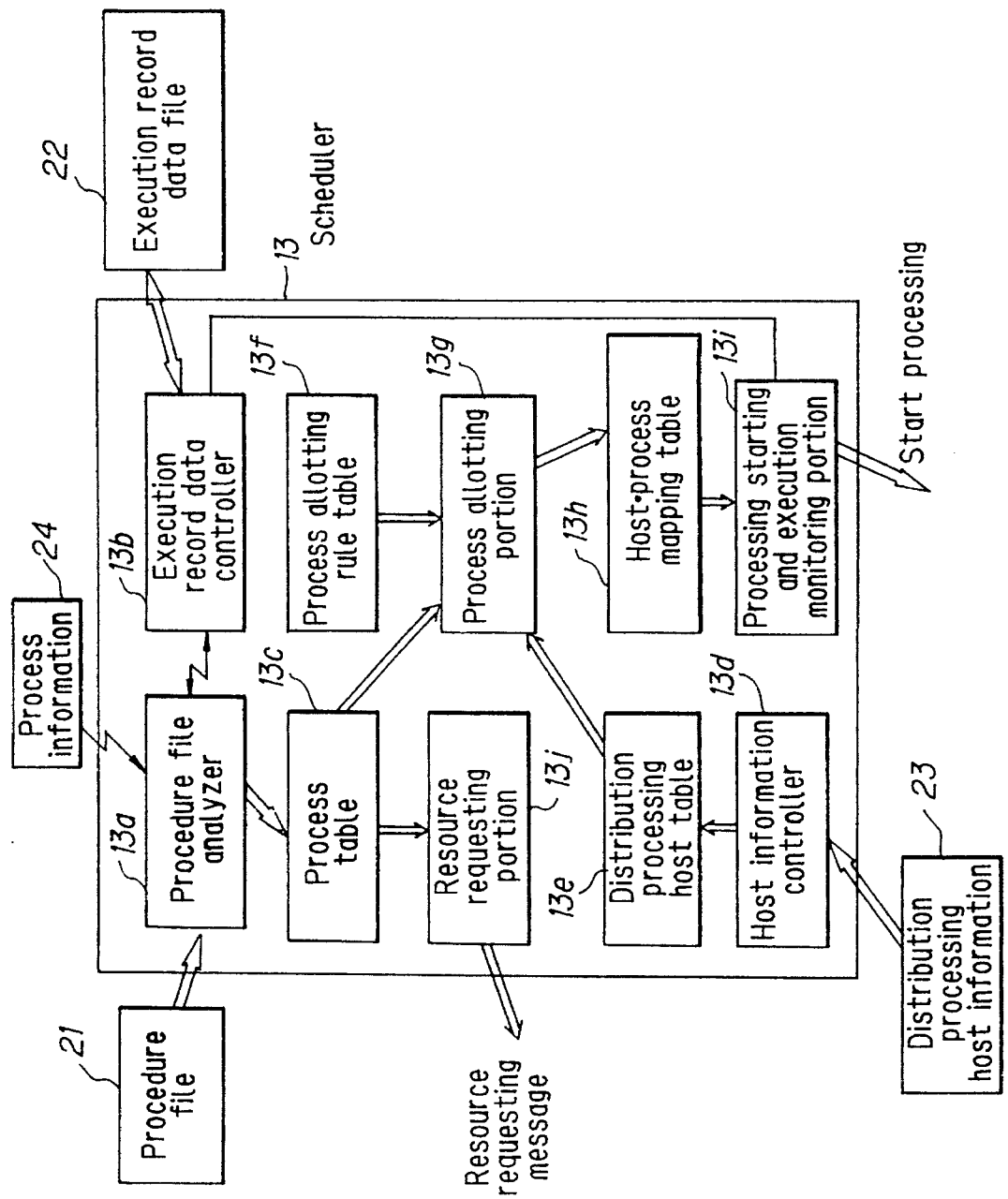
FIG. 11 shows the structure of a scheduler.

FIG. 11 shows the structure of the scheduler 13. The same numerals are provided for the elements which are the same as those in FIG. 8. In FIG. 11, the reference numeral 13a represents a procedure file analyzer for producing compiling commands by analyzing the contents of the procedure file 21 and outputting the relationship between the process such as the compiling command and the file and the size of the file with reference to the process information 24; 13b an execution record data controller for reading the data on the amount of processing or the like of each of the processes to be actually executed out of the execution record data file 22, controlling these data as an execution record data table and outputting the amount of processing, the processing time or the like; 13c a process table for storing the data on the procedure for each process and the amount of processing thereof; 13d a host information controller for controlling the distribution processing host information (CPU speed, CPU usage, etc.) 23 supplied from each of the hosts 1 to 5; and 13e a distribution processing host table (which corresponds to the process allotting computer table 13e in FIG. 8) for storing the host information such as the CPU speed (processing speeds) $V_{cpu}$ and the current CPU load n (usage) of each of the hosts 1 to 5, the host information being updated by the host information controller 13d. The reference numerals 13f represents a process allotting rule table, and 13j a later-described resource requesting portion for holding computer resources which are usable for distribution processing.

The reference numeral 13g represents a process allotting portion for allotting the processes to the hosts 1 to 5 on the basis of the data supplied from each of the tables 13c and 13e in accordance with a predetermined algorithm; 13h a host-.process mapping table (which corresponds to the computer.process table 13h in FIG. 8) for storing the correspondence of the computers to the processes which are created by the process allotting portion 13g; and 13i a processing starting and execution monitoring portion for allotting the processes to the computers in accordance with the contents of the mapping table 13h and monitoring the end of the executions of the processing. The processing starting and execution monitoring portion 13i monitors the time (processing time) elapsed from the starting of the processing to the end thereof, the amount of processing (the number of steps of processing) or the amount of processing per unit time (amount of processing/processing time) which is transmitted from a computer, and supplies the data to the execution record data controller 13b as the execution record data after the end of processing. The execution record data controller 13b stores the supplied execution record data and registers it in the execution record data file 22.

Process Table

FIG. 12 shows the structure of the process table 13c. The process table 13c is composed of a sequence number column 13c-1 for writing the reference number of a process therein, a starting process (compiling command indicating the procedure) column 13c-2, an execution record data column 13c-3, a file size column 13c-4, an execution mode column 13c-5, and a process ID column 13c-6. The execution mode represents an execution type such as a compiling processing mode and a pipeline processing mode. If the execution mode is a pipeline processing mode, it indicates that a pipeline processing is executed. In the execution record data column 13c-3, the amount of processing per unit time (data processing speed), the processing time or the like is written. Since the execution record data is expressed by the value calculated as a processing executed on one machine (computer), if the CPU speed is different, it is converted on the basis of the information.

The contents of the process table 13c are stored. In the execution record data column 13c-3, the best value (together with the situation at that time), the worst value and the average value, etc. of the execution record data are written.

Control of Compiling Process Distribution

A control system for the distribution of processes in the present invention will be explained with reference to an example of actual compiling processing.

Step 1: The procedure file 21 and the process information 24 are first input. The contents of the procedure file 21 are shown in the following. The process information 24 includes the file sizes of source files x.c, y.c, and z.c which are to be compiled. It is now assumed that the file size of the source file x.c is 100 KB, the file size of the source file y.c is 200 KB and the file size of the source file z.c is 150 KB.

Procedure File

| | |
|---|---|
| SRCS: x.c y.c z.c | (1) |
| OPT: −c | (2) |
| all: x.o y.o z.o | (3) |
| 1d z.o x.o y.o−o a.out | (4) |
| x.o: cc $(OPT) x.c | (5) |
| y.o: cc $(OPT) y.c | (6) |
| z.o: cpp z.c lcc1−0l as >z.o | (7) |

In the procedure file 21, (1) shows the abbreviations of the source files. That is, there are three source files x.c, y.c and z.c. (2) designates the option of the compiling processing. It is instructed that the compiling processing is executed by "−c" until the assembler and the processing is finished at the time of point when the .o file (intermediate object file) is created. (3) designates the name of the intermediate object files produced from the source files x.c, y.c and z.c. The intermediate files of these files are x.o, y.o and z.o, respectively. The symbol "1d" in (4) indicates a loader command which instructs that an executable program a.out is created by using several object files indicated after "1d". The symbol "o" designates the name of the file to be output and the files designated by the argument "1d" are combined in the designated order. (5) indicates the procedure for creating the intermediate object file x.o. That is, it is instructed that the source file x.c is compiled to create the intermediate object x.o. The symbol "cc" indicates a C-language compiling command. The symbol $(OPT) is a variable portion which is replaced by the option value "c" designated in (2). (6) designates the procedure for creating the intermediate object file y.o. That is, it is instructed that the source file y.c is compiled to create the intermediate object y.o. (7) designates the procedure for creating the intermediate object file z.o. That is, it is instructed that the source file z.c is processed by a preprocessor; the result is supplied to the main body cc1 of the next compiler which is connected to the pipe "l"; the main body cc1 of the compiler creates the file of an assembler code by compiling processing; the result is supplied to the next assembler "as" which is connected by the pipe "l"; and the assembler "as" creates the intermediate object file z.o. from the file of the assembler code.

Step 2: When the procedure file 21 and the process information 24 are input, the procedure file analyzer 13a produces the following compiling commands by analyzing the contents of the procedure file 21:

cc–c x.c     (8)

cc–c y.c     (9)

cpp z.c |cc1–0| as >z.o     (10)

1d z.o x.o y.o –o a.out     (11)

The compiling command (11) is executed after the end of the processing of the compiling commands (8), (9) and (10).

Since the parallel execution of the commands (8), (9) and (10) is possible due to the dependency of the files described above, the commands, the file sizes and the execution modes of these three commands are written in the starting process column 13c-2, the file size column 13c-4 and the execution mode column 13c-5, respectively (FIG. 13). In this case, since the command (10) is connected by the pipe, in other words, it is processed by a pipeline processing, the commands at the respective stages partitioned by the pipes "l" are separately written in the starting process column 13c-2. Thereafter, the command and the execution mode of the command (11) which is processed after the end of the processing of the commands (8), (9) and (10) are written in the starting process column 13c-2 and the execution mode column 13c-5.

In the file size column 13c-4, the sizes of the files x.c, y.c and z.c which are the objects of processing in the commands (8), (9) and (10), respectively, are written. In the execution mode column 13c-5, "self", "pipe (g-n)" or "gang" is written. The execution mode "self" means the process is executable executionable independently of other processes and the execution mode "pipe" means that the command is processed by a pipeline processing. The symbol "g" indicates a group, and n the order of execution of the pipe. The commands of the same group "g" are executed simultaneously. The execution mode "gang" means that the command is executed after the end of the processing of the processes having the sequence numbers in the parenthesis.

The "execution record data" is obtained by the inquiry to the execution record data controller 13b. If there is no execution record data, the allotment of the distribution is scheduled on the basis of the file size. The process ID column (P.ID) 13c-6 shows the process ID when the corresponding processing is started.

Step 3: The procedure file analyzer 13a then requires the execution record data controller 13b to supply an execution record data. The execution record data controller 13b reads the execution record data which correspond to the required "processes" out of the execution record data file 22, creates an execution record data table shown in FIG. 14 and transmits the execution record data table to the procedure file analyzer 13a. It is assumed that the processes having the sequence numbers 1, 2 and 6 have no execution record data, and with respect to the processes having the sequence numbers 3, 4 and 5, the ratio of the processability (amount of processing per unit time) 100:20:40 is obtained in advance from measurement or the like. If the processing time is used as execution record data, T: 60 (executing time is 60 sec), for example, is written in the execution record data table. The procedure file analyzer 13a fills in the corresponding execution record data column 13c-3 of the process table 13c with each execution record data with reference to the execution record data table. In this way, the process table 13c shown in FIG. 15 is created.

Step 4: In parallel with the steps 1 to 3, the host information controller 13d periodically updates the contents of the distribution processing host table 13e. The contents of the current distribution processing host table 13e are shown in FIG. 16. The distribution processing host table 13e is composed of a host number column 13e-1, a host name column 13e-2, a user column 13e-3, a CPU usage column 13e-4, a CPU load column 13e-5 and a CPU speed column 13e-6. In FIG. 16, the CPU usage of the host 4 is 30%, and the CPU usages of the other hosts are 0%.

Step 5: When the process table 13c is created, the process allotting portion 13g allots the processes to the hosts by using the data of the process table 13c and the distribution processing host table 13e. In the pipeline processing of the command (10), the processes are separated at each stage before distribution.

The file size is utilized as the amount of processing, and the processes of the sequence numbers 1 to 6 are sorted in the order of amount of processing (step 5a). As a result, the processes having the sequence numbers (hereinunder referred to as "Seq") 1 to 6 are arranged as shown in FIG. 17.

The process allotting portion 13g obtains the host having the smallest cumulative amount of processing with reference to a cumulative processing amount table FIGS. 18(a)–(d), and the process (Seq 2) having the largest amount of processing (the process Seq 2) is allotted to this host. Since the cumulative amount of processing of each host at the initial time is 0, the process Seq 2 is allotted not on the basis of the amount of processing but to the host having the highest CPU speed and the smallest CPU load. In other words, the effective CPU speed of each host is obtained from the formula (b), and the process Seq 2 is allotted to the host having the highest effective CPU speed. In this case, since the effective CPU speeds of the hosts 1 to 5 are "1", "1", "1", "1.4" and "2", respectively, the process Seq 2 is allotted to the host 5 (step 5b).

Thereafter, the cumulative amount of processing of the host 5 is updated. The value 100 KB obtained by dividing the file size 200 KB by the effective CPU speed 2 is added to the current cumulative amount of processing (initial value is 0), and the value obtained by the addition is written in the cumulative processing amount table (FIG. 18(b), step 5c).

Whether or not the allotment is finished is then judged (step 5d). If the answer is in the negative, the process (Seq 4) having the second largest amount of processing is similarly allotted to a predetermined host. That is, the process Seq 4 is allotted to the host 4 having the highest effective CPU speed of the hosts 1 to 4, and the cumulative amount of processing of the host 4 is updated (FIG. 18 (c)).

Similarly, the processes Seq 5, Seq 3 and Seq 1 are allotted to the hosts 2, 1 and 3, respectively, and the respective cumulative amounts of processing are updated as shown in FIG. 18(d).

Finally, the process Seq 6 is allotted to the host having the smallest amount of processing. If two or more hosts have the smallest amount of processing, the host having the highest effective CPU speed is selected. In this case, although the hosts 1, 3 and 5 have the smallest amount of processing, since the effective CPU speed of the host 5 is the highest, the process Seq 6 is allotted to the host 5, thereby ending the allotment processing.

Step 6: If the allotment processing is finished at step 5, the host.process mapping table 13h which shows the correspondence of the hosts to the processes is created as shown in FIG. 19.

Step 7: When the creation of the host.process mapping table 13h is finished, the processing starting and execution monitoring portion 13i instructs the corresponding hosts to execute the processes Seq 1 to Seq 5 for the purpose of parallel execution. The processes Seq 3, Seq 4 and Seq 5 are connected in series by the pipes and serially executed. When all of the processings of the processes Seq 1 to Seq 5 are finished, the processing starting and execution monitoring portion 13i instructs the host 5 to execute the process Seq 6.

Step 8: The processing starting and execution monitoring portion 13i monitors the time (processing time) taken for the actual processing. The time elapsed from the time when the processing starting and execution monitoring portion 13i instructed to the host to start processing to the time when the host reports the end of the processing is monitored as the processing time. The processing starting and execution monitoring portion 13i multiplies the processing time by the effective CPU speed and transmits the value obtained to the execution record data controller 13b as the execution record data. For example, if the execution of the process Seq 1 has taken 10 seconds, the execution of the process Seq 2 has taken 11 seconds, and the execution of the process Seq 4 has taken 9 seconds, since the effective CPU speed of the host 3 which executes the process Seq 1 is 1, 10 seconds (T: 10) is the execution record of the process Seq 1. Since the effective CPU speed of the host 5 which executes the process Seq 2 is 2, 22 (=11×2) seconds is the execution record of the process Seq 2. Since the effective CPU speed of the host 4 which executes the process Seq 4 is 1.4, 12.6 (=1.4×9) seconds is the execution record of the process Seq 4. The processes Seq 3 to Seq 5 are executed by a pipeline processing, and the ratio of the processing speeds P is 5:1:2, the execution record of the process Seq 3 is 2.52 (=12.6/5) seconds and the execution record of the process Seq 5 is 6.3 seconds.

Step 9: By registering the execution records transmitted from the record data controller 13b into the execution record data file 22, the compiling process distribution processing is finished. FIG. 20 is a newly created execution record data table.

Thereafter, the processes are arranged not in accordance with file size but in accordance with the processing time T, and serially allotted to the hosts.

Figure 21:
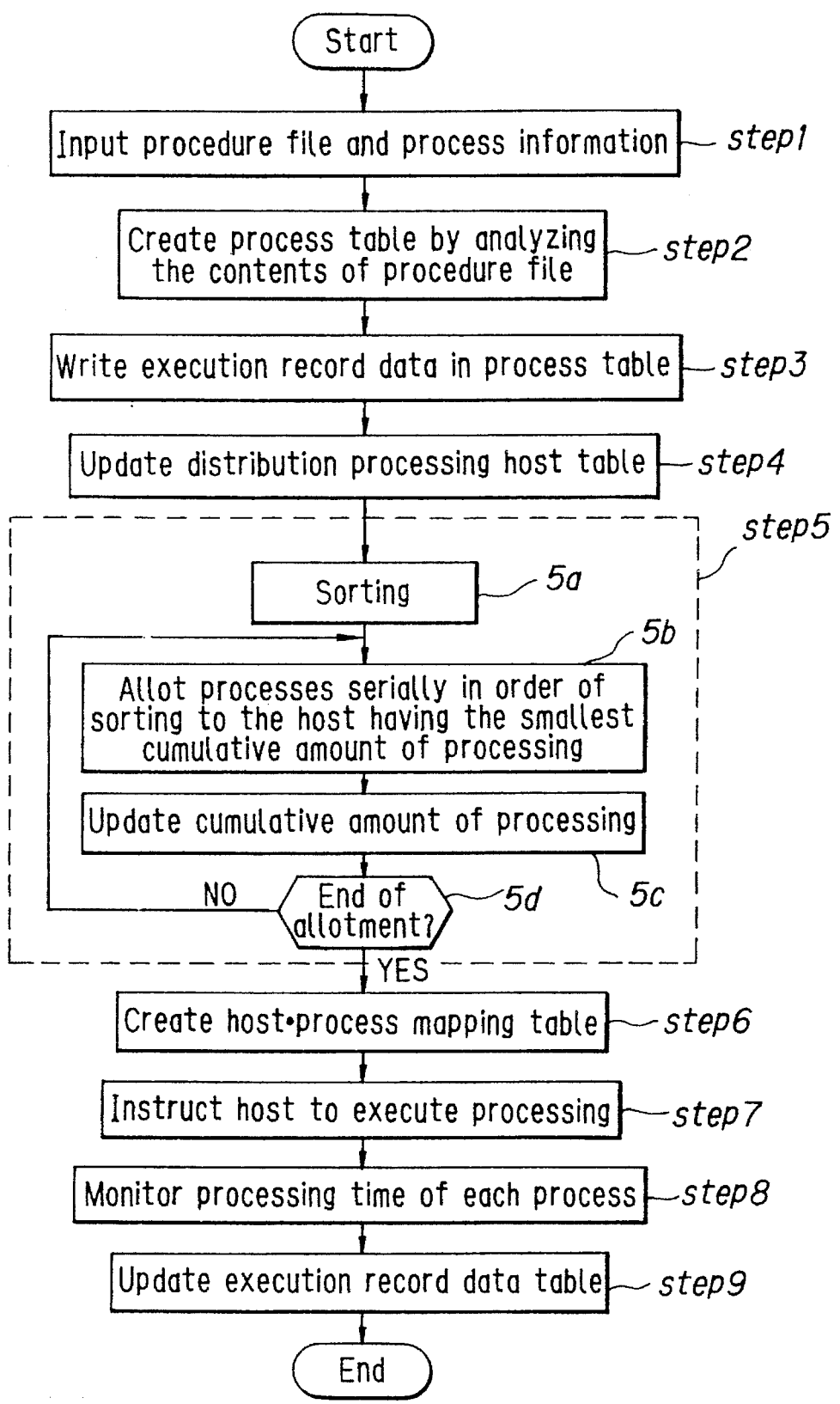
FIG. 21 is a flowchart of compiling process distribution.

FIG. 21 is a flowchart of the entire system of the above-described compiling process distribution processing. The step number in each block corresponds to the step number in the above explanation.

In the above-described compiling process distribution, the processes are allotted in accordance with the algorithm (6), but it is also possible to appropriately adopt the algorithms (1) to (5).

(d) Control of Collection of Situation Data

Local Resource Manager

Figure 22:
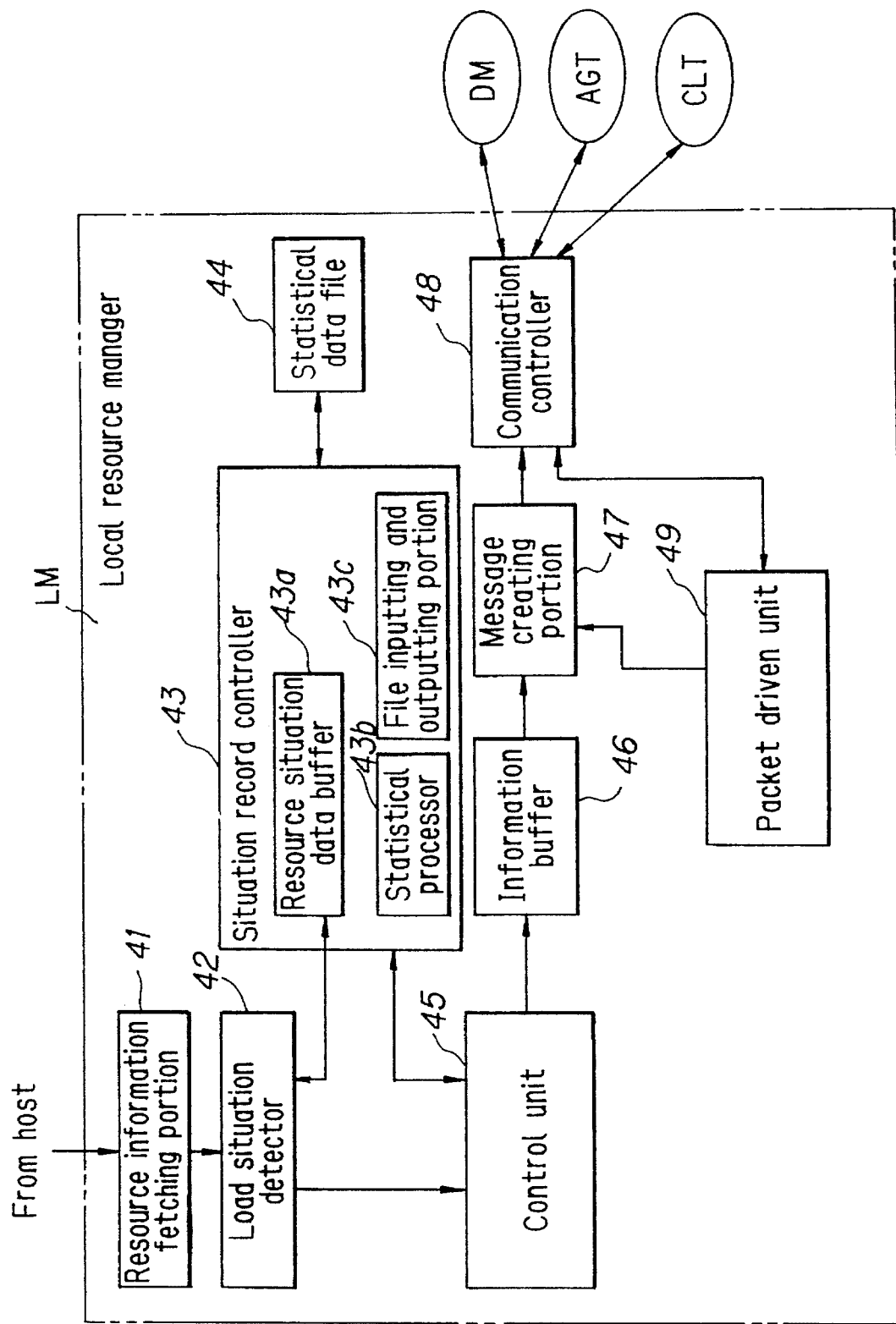
FIG. 22 shows the structure of a local resource manager LM.

FIG. 22 shows the structure of the local resource manager LM for monitoring the situation of a computer and transmitting situation data to the domain resource manager DM (FIG. 3). The reference numeral 41 represents a resource information fetching portion for periodically fetching the situation data of a host, namely, the usage of a resource (CPU, memory, disk). The situation of a host will be represented by the CPU usage n in the following explanation. The reference numeral 42 represents a load situation detector for comparing the current usage with a past usage, for example, the average of the past ten usages or the preceding usage. A situation record controller 43 is provided with a resource situation data buffer 43a for storing the usage n and other data input from the load situation detector 42 in correspondence with the day of the week and the time, a statistical processor 43b for statistically processing each data, and a file inputting and outputting portion for inputting and outputting a statistical data file 44.

The resource situation data buffer 43a stores situation data such as the usage ($\eta$) 43a-3, the probability (Pd) 43a-4 of a breakdown of the computer, the stability (Sa) 43a-5 of the computer, the remaining service time (Ts) 43a-6, the short-term and long-term prediction data 43a-7, 43a-8, and the data valid time (Te) 43a-9 in correspondence with the day of the week 43a-1 and the time 43a-2, as shown in FIG. 23(a). The situation data, except the usage ($\eta$), are calculated and stored by a later-described control unit 45. The resource situation data buffer 43a also stores hardware information such as the CPU speed, the type of the CPU and the capacity of the mounted memory, as shown in FIG. 23(b).

The statistical processor 43b calculates the average value, the sum, the number of samples, the standard variation, etc. of the data in each column of the resource situation data buffer 43, and collectively stores these data together with each situation data in a disk or the like as the statistical data file 44.

The control unit 45 calculates the situation data such as the stability Sa of the computer, the data valid time Te and prediction data on the basis of the result of the comparison by the load situation detector 42, and controls the transmission of the situation data. The stability Sa of the computer and the data valid time Te are calculated in the following manner, for example.

It is now assumed that the initial value of the stability Sa is 50 and the initial value of the data valid time Te is 2 seconds. It is also assumed that the stability takes a value of 0 to 100, and the data valid time takes a value of 2 to 300 seconds. If the stability and the initial value exceed these values from the result of calculation, they are replaced by the respective minimum values or maximum values.

(1) When the variation of the usage is less than 1%, 10 is added to the current stability (Sa+10→Sa) and 5 is added to the current data valid time (Te +5→Te).

(2) When the variation is not less than 1% and less than 2%, since the load of the computer is stable, the stability and the data valid time are increased in accordance with Sa+10→Sa and Te+5→Te, respectively.

(3) When the variation is not less than 2% and less than 5%, neither the stability nor the data valid is changed.

(4) When the variation is not less than 5% and less than 7%, since the load of the computer is slightly unstable, the stability and the data valid time are decreased in accordance with Sa−2→Sa and Te−1→Te, respectively.

(5) When the variation is not less than 7% and less than 10%, since the load of the computer is unstable, the stability and the data valid time are restored to the initial values.

(6) When the variation is not less than 10 and less than 20%, the stability is obtained in accordance with Sa−20 →Sa and the data valid time is restored to the initial value.

(7) When the variation is not less than 20%, the stability Sa is set at 0, the data valid time is restored to the initial value, the situation data are supplied to the domain resource manager DM.

(8) When the variation of not less than 20% consecutively repeats several times, the transmission of the situation data to the domain resource manager DM is stopped and a message for suspending the data transmission is transmitted to the domain resource manager DM. It is possible to change the stability and the data valid time depending upon whether or not the variation of the usage is not less than a predetermined value.

The probability Pd of a breakdown of the host is calculated in accordance with the statistical information. For example, the number of times a host broke down during a predetermined measuring time is obtained and the number of times is divided by the number of days of the measuring time. The remaining service time (Ts) is the time from the current time to the time when the probability Pd of the breakdown of the computer will reach 10%, and it is calculated by using the execution record data. The short-term and long-term prediction data are predicted values of the usage in a short time zone (e.g., within 5 minutes) and in a long time zone (e.g., within 30 minutes), respectively, from the current time, and they are calculated from the execution record data.

The reference numeral 46 represents an information buffer for holding the situation data or the like which are to be transmitted to the domain resource manager DM under the instruction of the control unit 45. The data to be transmitted are the name of the host, the usage $\eta$, the stability Sa of the host, the probability Pd of a breakdown of the host, the remaining service time Ts, the short-term and long-term prediction data, the data valid time Te (actually 1 second is added to the data valid time obtained in order to absorb delay in transmission), the situation ID and the hardware information, as shown in FIG. 24. In this case, the usage $\eta$ is the situation data of the computer, and the stability, the data valid time, the probability of breakdown and the remaining service time are data on the reliability of the situation data.

Figure 25:
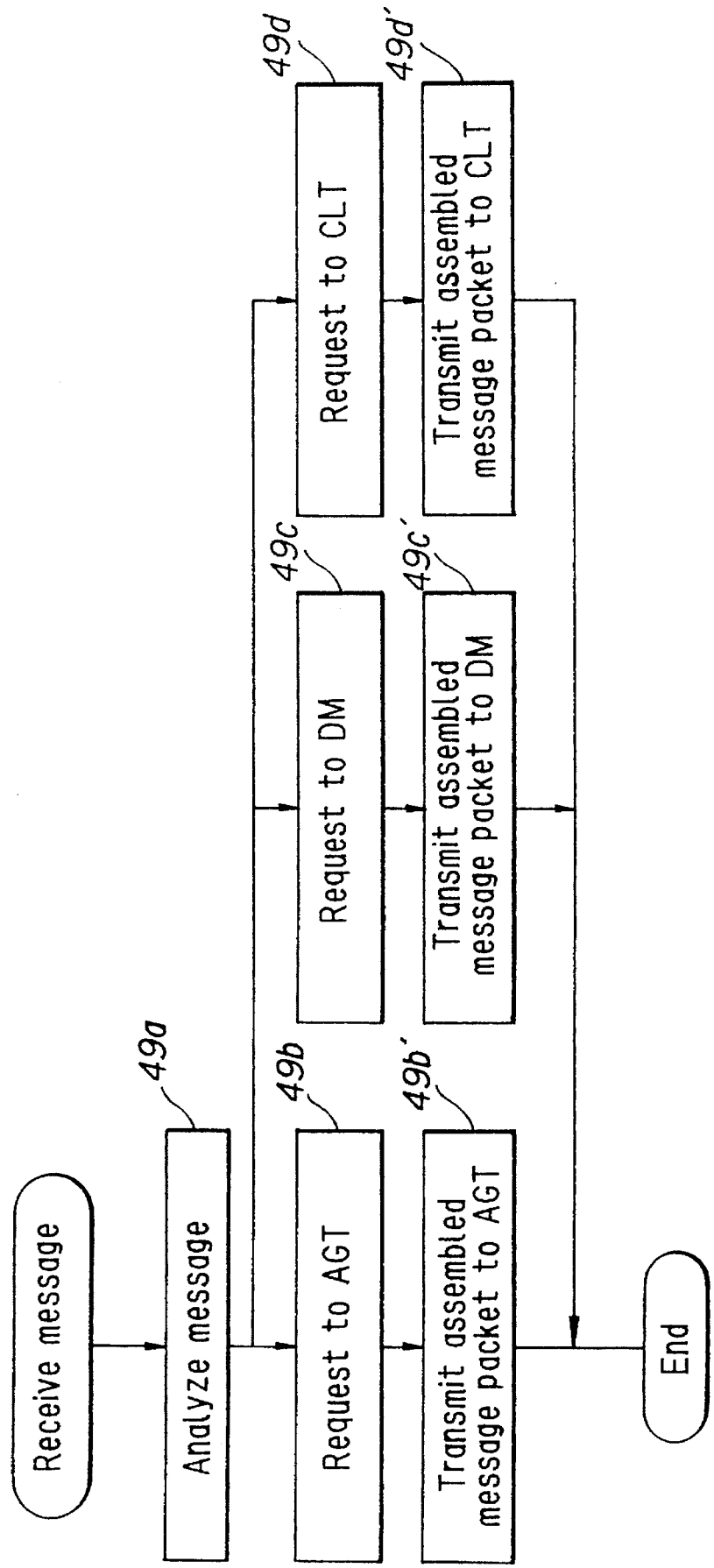
FIG. 25 is a flowchart of a packet driven unit.

The reference numeral 47 represents a message creating portion for supplying a message (also referred to as "packet" hereinafter) to the domain resource manager DM, 48 a communication controller for transmitting and receiving a message to and from the domain resource manager DM, an agent AGT and a client CLT, and 49 a packet driven unit for processing a message (packet). When the packet driven unit 49 receives a message through the communication controller 48, the packet driven unit 49 analyzes the massage, as shown in FIG. 25 (step 49a). If the message is a request to an agent, the packet driven unit 49 assembles a message packet and supplies it to the agent (steps 49b and 49b'). If the message is a request to the domain resource manager DM, the packet driven unit 49 assembles a message packet and supplies it to the domain resource manager (steps 49c and 49c'). If the message is a request to an client, the packet driven unit 49 assembles a message packet and supplies it to the client (steps 49d and 49d').

Processing Flow of Control Unit

Figure 26:
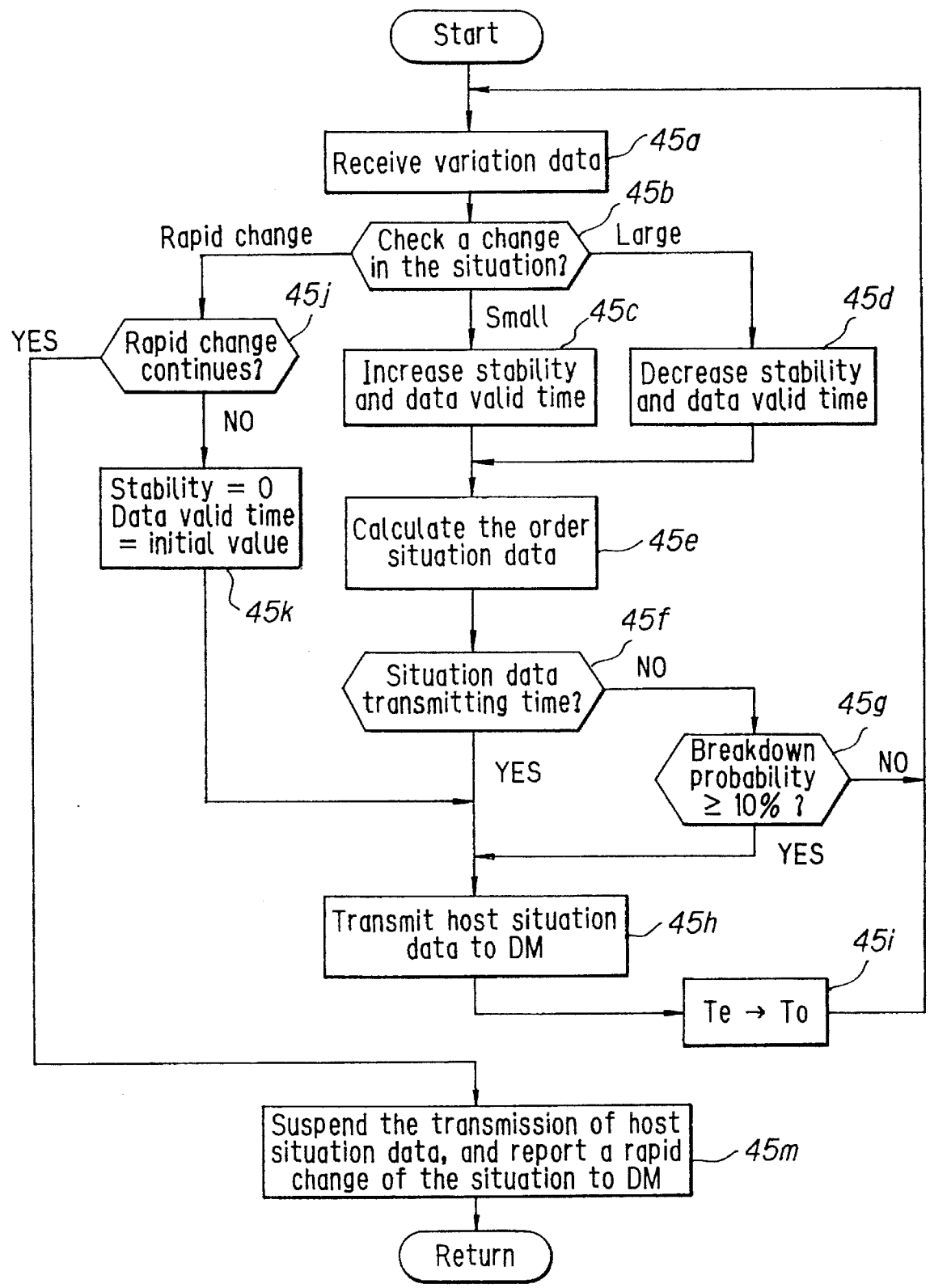
FIG. 26 shows the processing flow of the local resource manager LM.

FIG. 26 shows the processing flow of the control unit 45.

When the control unit 45 receives the data on the usage and the variation (step 45a), the control unit 45 checks a change in the situation (step 45b). When the variation of the usage is small, the control unit 45 increases the stability Sa and the data valid time Te (step 45c), while decreasing the stability Sa and the data valid time Te (step 45d) when the variation of the usage is large. The initial value of the data valid time is 2 seconds, which constitutes the first situation data transmitting time $T_0$.

The control unit 45 then calculates the probability of a breakdown of the host and the remaining service time of the host, etc. (step 45e). Thereafter, the control unit 45 judges whether or not the situation data transmitting time $T_0$ has come (step 45f). If the answer is in the negative, the control unit 45 judges whether or not the probability of a breakdown of the host is not less than 10% (step 45g). If the probability is less than 10%, the process returns to the start and the subsequent processings are repeated.

On the other hand, if the situation data transmitting time To has come, or if the probability of a breakdown of a host is not less than 10%, the control unit 45 transmits the situation data (usage), the stability, the data valid time Te, etc. at the current time to the domain resource manager DM (step 45h). The data transmitting time $T_0$ is held as the current data valid time (Te→$T_o$), the process returns to the start and the subsequent processings are repeated.

When the variation of the usage is not less than 20%, namely, when the situation assumes a rapid change at step 45b, whether or not the rapid change has consecutively repeated several times is judged (step 45j). If the answer is "NO", the stability Sa is set at 0 and the data valid time Te is restored to the initial value (step 45k). The control unit 45 supplies the situation data to the domain resource manager DM, the data valid time Te is set at To, the process returns to the start, and the subsequent processings are repeated.

If the rapid change, namely, the usage variation of not less than 20% has consecutively repeated several times, the transmission of the situation data to the domain resource manager DM is stopped and a message for suspending the data transmission due to a rapid change is transmitted to the domain resource manager DM (step 45m). In this case, the message for suspending the data transmission is supplied at an interval of the initial value of the data valid time Te. When the rapid change has stopped, the processings are resumed at step 45a.

If a special situation is produced, the situation data is not transmitted. For example, if the CPU usage exceeds a preset value, e.g., 80%, and it is impossible to execute a process under a remote control of another computer, the situation data is not transmitted. In this case, the domain resource manager DM directly inquires of the computer about the situation as occasion demands.

While a computer is executing a process under a remote control, in answer to the request from a client, the situation data is not transmitted, and after the end of the processing, the situation data is transmitted. If the situation data is transmitted during the execution of a process under remote control, the usage obtained by subtracting the usage for the remote processing from the total usage is set as the true usage. In this way, it is possible to predict the accurate usage after the remote processing is finished.

As described above, if a computer has a stable situation, the number of data transmitted per unit time decreases. The domain resource manager DM for collecting situation data can grasp the situation of the computer with approximately the same accuracy as in the case of frequent transmission of the situation data by utilizing the stability Sa, the data valid time Te and the prediction data which are supplied together with the situation data.

Domain resource manager DM

FIG. 27 shows the structure of the domain resource manager DM which collects and controls the situation data of each computer and determines usable computers in answer to a request from a client.

The reference numeral 51 represents a host situation data storage unit for storing the host situation data supplied from the local resource manager LM of each computer, 52 a host situation data controller for controlling the contents of the host situation data storage unit 51, and 53 a resource use information storage unit for receiving the data on the resource use situation of a client from an agent AGT (FIG. 3) and storing the data. The resource use information includes the name of the client host, the name of the resource used, the amount of resource used, and the time during which the resource is used. The reference numeral 54 represents a resource use information controller and 55 a resource allotment scheduler for determining computers which are usable by a client with the host situation and the resource use information of the client taken into consideration in answer to a request from the client. The reference numeral 56 represents a communication controller for receiving and supplying a message to and from the local resource manager LM of each computer, and 57 a packet driven unit.

The message to be received includes a host situation message MS1 (FIG. 24) supplied from a local resource manager LM, a resource use information message MS2 supplied from an agent AGT, and a resource use requesting message MS3 supplied from a client CLT. The resource use requesting message MS3 includes the address, the request for allotment, the type of resource (e.g., CPU), the necessary amount (number of CPUs), the host name, and the name of the connection port, as shown in FIG. 28(*a*).

Processing of Domain Resource Manager DM

FIG. 29 shows the processing flow of the domain resource manager DM as a whole. When the packet driven unit 57 receives a message from a local resource manager LM through the communication controller 56, the packet driven unit 57 analyzes the message. If the message received is the host situation message MS1, the packet driven unit 57 transmits the massage to the host situation data controller 52, and the host situation data controller 52 stores the host situation data in the host situation storage unit 51 (step 50*a*). If the message received is the resource use information message MS2 supplied from an agent AGT, the packet driven unit 57 transmits the message to the resource use information controller 54, and the resource use information controller 54 registers the resource use information of each client in the resource use information storage unit 53 (step 50*b*). If the message received is the resource use requesting message MS3 supplied from a client CLT, the packet driven unit 57 transmits the message to the resource allotment scheduler 55. The resource allotment scheduler 55 determines usable computers with reference to the host situation and the resource use information of the client, and supplies a connection requesting message MS4 to the agents AGT of the computers (step 50*c*. The connection requesting message MS4 includes the address, the request for AGT connection, the type of resource, the host name, and the number of the connection port, as shown in FIG. 28(*b*).

Processing of Host Situation Data Controller

Figure 30:
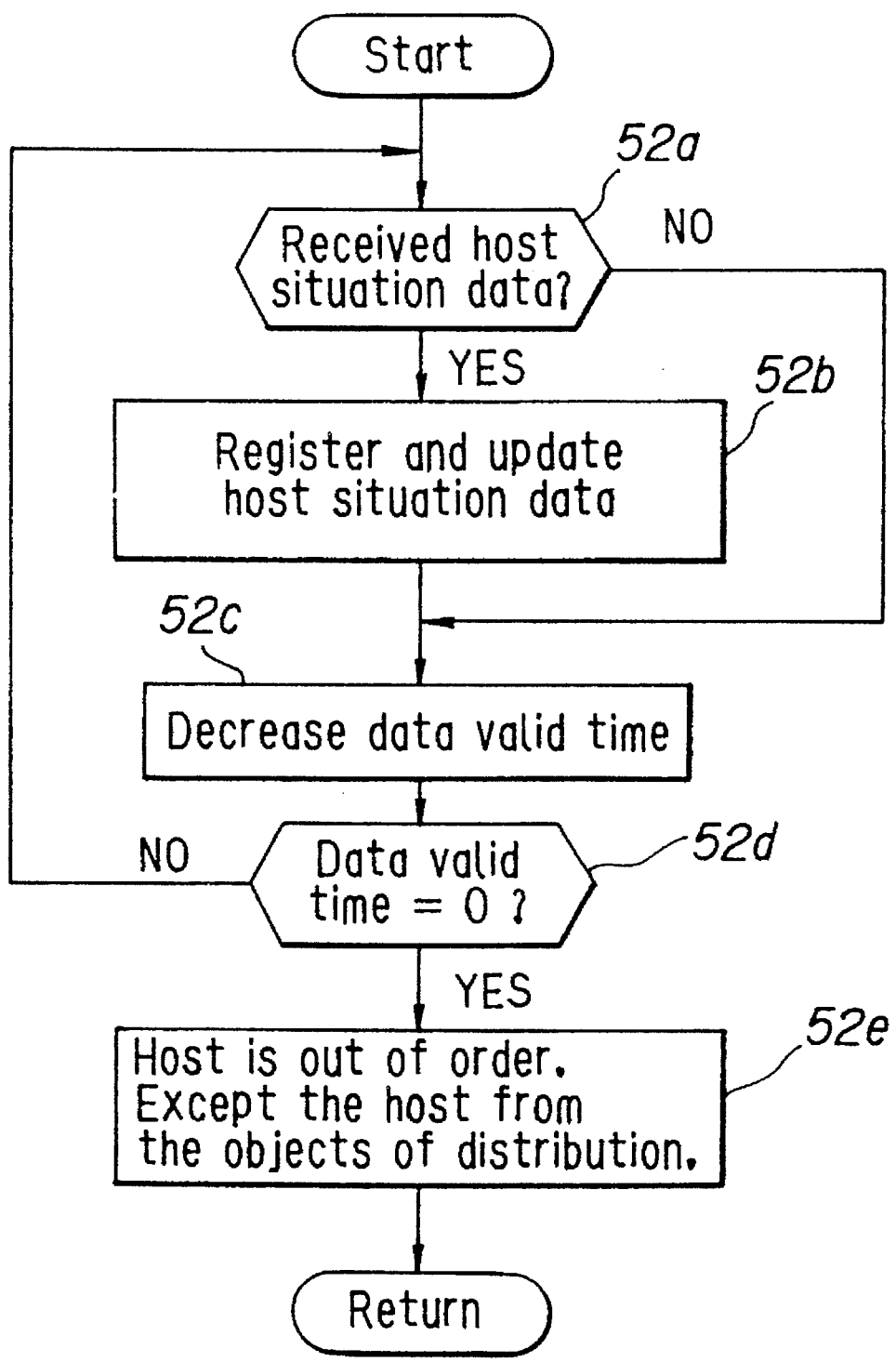
FIG. 30 shows the processing flow of a host situation data controller.

FIG. 30 shows the processing flow of a host situation data controller. In FIG. 30, the situation of only one host will be explained.

When the host situation data controller 52 receives the host situation message MS1 from the packet driven unit 57, the host situation data controller 52 stores the host situation data (FIG. 24) in correspondence with the host name in the host situation data storage unit 51 (steps 52*a*, 52*b*). The host situation data controller 52 then decreases the data valid time Te included in the host situation data at a predetermined interval of time (step 52*c*) and judges whether or not the data valid time Te reaches 0 (step 52*d*). If Te is not 0, the process returns to step 52*a*, and if the host situation message is not received, the data valid time Te is decreased.

If a new host situation message MS1 is received before Te becomes 0, the current host situation data is replaced by the newly received host situation data, and the above processing is repeated. If the computer normally works, a new host situation data is supplied from the local resource manager LM.

On the other hand, if the data valid time Te=0, the computer is considered to be out of order and the computer is excepted from the objects of distribution. That is, when a client requests the use of a computer, this computer is not allotted (step 52*e*).

Processing of Resource Allotment Scheduler

Figure 31:
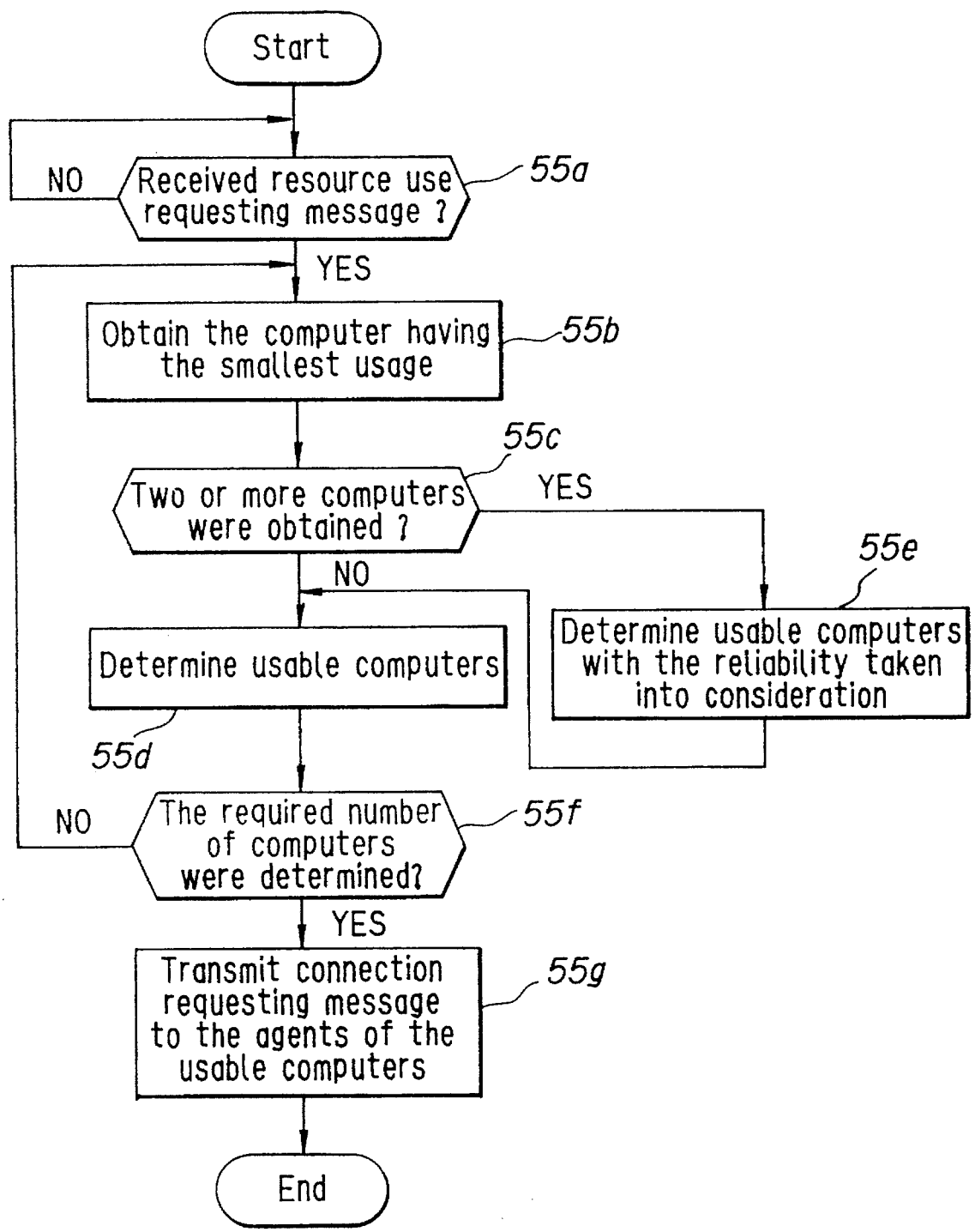
FIG. 31 shows the processing flow of a resource allotment scheduler.

FIG. 31 shows the processing flow of the resource allotment scheduler 55.

When the resource allotment scheduler 55 receives the resource use requesting message MS3 from the packet driven unit 57, the resource allotment scheduler 55 selects the computer having the smallest usage as a usable computer (steps 55*a*, 55*b*, 55*d*). In this case, if two or more computers have the smallest usage (step 55*c*), the usable computer is determined with the stability, CPU speed, the probability of the breakdown of a host, the predicted value of the future usage and the remaining service time taken into consideration (step 55*e*). For example, an evaluation function having these factors as a variable is prepared, and the computer having the largest evaluation function is determined to be the usable computer. In this case, the evaluation function is determined so that the higher the stability and the CPU speed, the smaller the probability of the breakdown of a host and the predicted value of the future usage and the longer the remaining service time, the larger the evaluation function becomes.

Thereafter, the resource allotment scheduler 55 judges whether or not the same number of computers as the number required by the client have been determined (step 55*f*). If the answer is "NO" the process returns to the step 55*b* and a similar processing is executed. If the answer is "YES", the resource allotment scheduler 55 transmits the connection requesting message MS4 to the agents of the usable computers, thereby ending the computer resource allotment processing.

When a plurality of clients simultaneously request the use of computers, the resource allotment scheduler 55 determines the computer allotment schedule on the basis of the resource use information of each client, and allots the computer resources to the clients.

(e) Control of Resource Use Requesting Messages from Clients

Structure of Client

Figure 32:
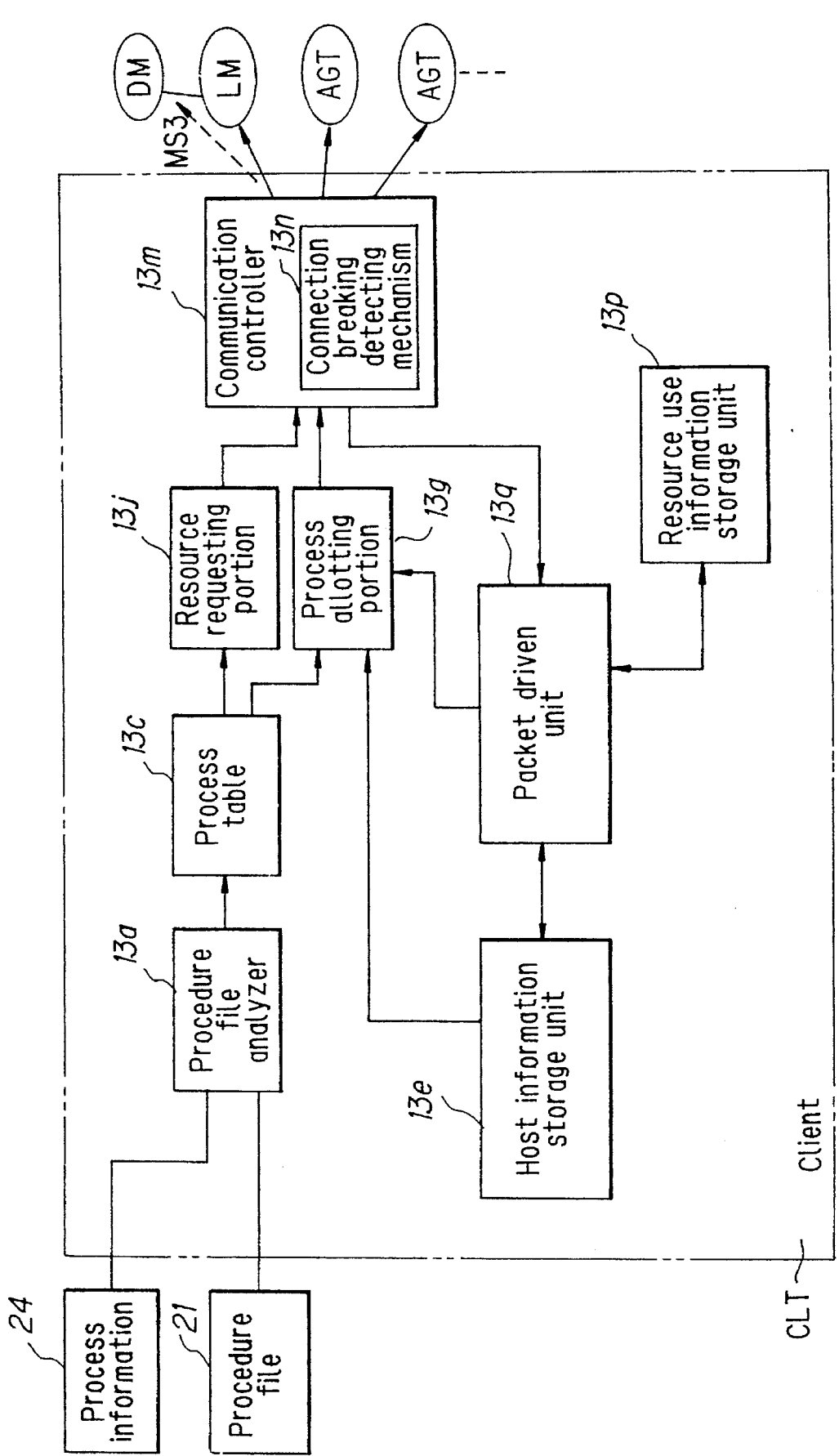
FIG. 32 shows the structure of a client.
Figures 33, 34:
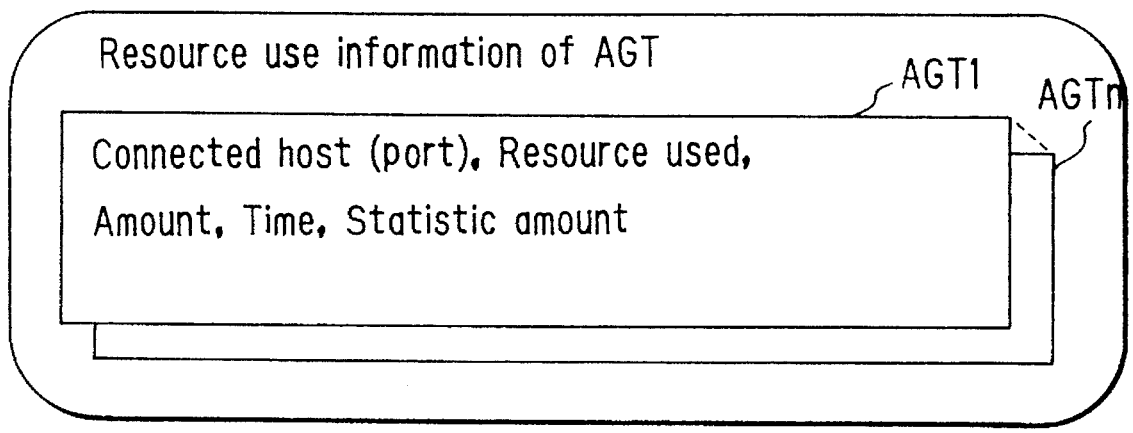
FIG. 33 is an explanatory view of resource use information.
FIG. 34 is an explanatory view of the contents of a resource use token.

FIG. 32 shows the structure of a client. The same numerals are provided for the elements which are the same as those in FIG. 11. In FIG. 32, the reference numeral 13*a* represents a procedure file analyzer for producing processing commands by analyzing the contents of the procedure file 21 and outputting the relationship between the process such as the processing command and the file and the size of the file with reference to the process information 24; 13*c*, a process table for storing the data on each process and the amount of processing thereof; 13*e*, a host information storage unit for storing the host information (usage, stability, hardware information, etc.) included in the resource use token which is supplied from a usable computer; 13g, a process allotting portion for allotting processes to the usable computers; 13j, a resource requesting portion for creating the resource requesting message MS3 (FIG. 28(a)) in accordance with the processing command; and 13m, a communication controller having a connection breaking detecting mechanism 13n for detecting a breaking of the connection established between the communication controller and agents. The reference numeral 13p represents a resource use information storage unit for storing the name of the host which is utilized for the distribution of the processes, the port number, the name of the resource used, the amount of resource used, the time during which the resource is used, the statistical data of amount, etc. in correspondence with the agent, as shown in FIG. 33. The reference numeral 13q represents a packet driven unit for analyzing the message received from a local resource manager LM or an agent AGT.

The connection breaking detecting mechanism 13n detects a breaking of the connection (1) by detecting an error at the time of writing data into the corresponding port, (2) by setting an option of KEEPALIVE (UNIX) when a connection is established and detecting an interruption produced from the OS when the connection is cut, or (3) by receiving the message transmitted before a computer is broken down to the effect that the connection will be cut.

Operation of Client

The procedure file analyzer 13a produces processing commands by analyzing the contents of the procedure file 21, outputs the relationship between the process such as the processing command and the file and the size of the file with reference to the process information 24, and stores these data in the process table 13c. The resource requesting portion 13j determines the amount of resource (number of computers) necessary for the distribution of processes on the basis of the procedure stored in the process table 13c so as to create the resource use requesting message MS3, and supplies the message MS3 to the domain resource manager DM through the local resource manager LM (FIG. 27). The domain resource manager DM determines usable computers, as described above, and transmits the connection requesting message MS4 to the agents of the usable computers.

Each of the agents AGT of the computers which received the connection requesting message MS4 (1) establishes a connection with the client CLT, (2) and then supplies a computer resource use token which allows the exclusive use of the computer resource to the client. The computer resource use token includes, for example, the token ID, situation of the resource, the amount of usable resource, the stability of the resource, the resource usable time limit, the hardware information (CPU speed), the token valid time, etc., as shown in FIG. 34.

When the packet driven unit 13a receives a resource use token from an agent AGT, it stores the host information included in the token in the host information storage unit 13e and updates the resource use information stored therein in correspondence with the agent AGT. The packet driven unit 13a also instructs the process allotting portion 13g to execute the allotment of the processes. The process allotting portion 13g distributes the processes to the usable computers under the distribution control explained in a Schematic explanation of the invention.

When the packet driven unit 13a receives a resource use end message from an agent AGT, it deletes the host information in the host information storage unit 13e which corresponds to the agent AGT.

When a breaking of a connection is detected by the connection breaking detecting mechanism 13n, the packet driven unit 13a regards the breaking of the connection as the breakdown of the computer or rejection of forced use of the computer, and deletes the host information in the host information storage unit 13e which corresponds to the agent AGT with which the connection has been cut. Thereafter, the resource allotting portion 13g distributes the processes to the computers except the computer with which the connection has been cut. The resource requesting portion 13j produces a message again to obtain a resource, if necessary.

(f) Control of exclusive allotment of computer

In order that a client CLT can actually ask the usable computers which are determined by the domain resource manager DM to execute the processes, it is necessary to obtain permission for use from the agents of the respective computers.

Structure of Agent

Figure 35:
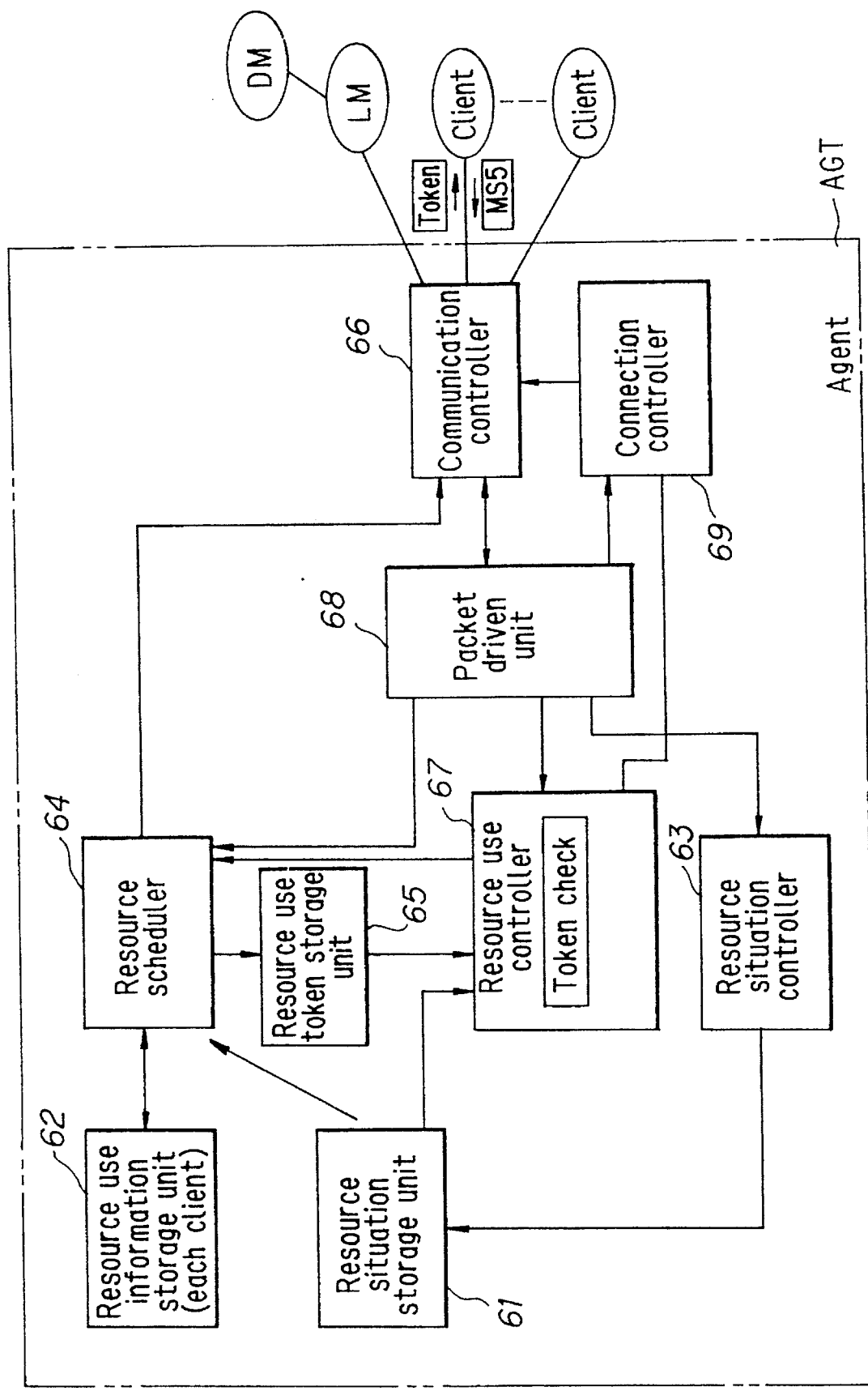
FIG. 35 shows the structure of an agent.

FIG. 35 shows the structure of an agent AGT.

Figure 36:
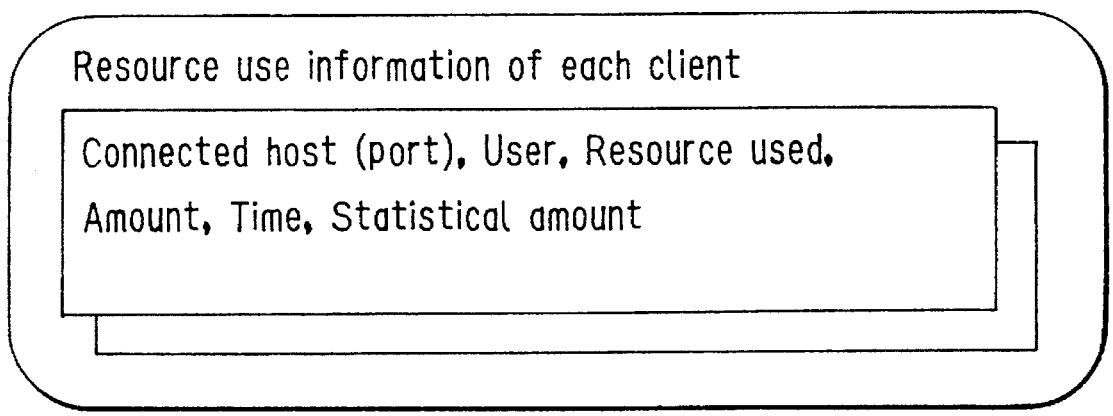
FIG. 36 is an explanatory view of the resource use information for each client.

The reference numeral 61 represents a resource situation data storage unit for storing the situation data of a computer resource (CPU usage), the amount of usable resource, the stability of the resource, etc., and 62 represents a resource use information storage unit for storing the resource use information of each client. The resource use information of each client includes the name of the host of a client, the number of the connection port, the user, the resource used, the amount of resource used, the time during which the resource is used, the statistical data of the amount, etc., as shown in FIG. 36.

The reference numeral 63 represents a resource situation controller for registering the resource situation (host situation) of the host of the agent in the resource use situation storage unit 61, 64 represents a resource scheduler for executing the control of the allotment of a resource, the establishment of a connection and the transmission of a resource use token (FIG. 34) with respect to a plurality of clients; 65 represents a resource use token storage unit; 66 represents a communication controller; 67 represents a resource use controller for checking the token and controlling the execution of the processing command supplied from a client; 68 represents a packet driven unit; and 69 represents a connection controller for controlling the establishment/breaking of a connection with a client CLT.

Control of Permission for Use by Token

The domain resource manager DM determines usable computers in answer to the request for the use of a resource from a client, as described above, and transmits the connection requesting message MS4 (FIG. 28(b)) to the agents of the usable computers. When the packet driven unit 68 of each agent receives the message through the communication controller 66, the packet driven unit 68 transmits the message to the resource scheduler 64 and the connection controller 69. The connection controller 69 establishes a connection with the client CLT by using the host name and the port number which are designated in the connection requesting message MS4 in accordance with the TCP/IP protocol in the UNIX.

The resource scheduler 64 then determines the client to which the resource is allotted on the basis of the resource situation (the situation of its own computer) and the resource use information of each client, creates a resource use token and supplies the token to the client. At this time, the resource scheduler 64 stores the contents of the resource use token in the resource use token storage unit 65 in correspondence with the token ID. The resource scheduler 64 also updates the contents of the resource use information storage unit 62 for the client.

When a plurality of clients require a resource, the resource scheduler 64 supplies a resource use token so that the resource is allotted to the clients in an ascending order of amount of resource used and the time during which the resource is used on the basis of the resource use situation of the client, so that the resource is allotted to the clients in turn in a round robin, or so that the clients are alternately permitted to use the resource. Therefore, even if a plurality of clients simultaneously require a resource, the agent AGT supplies a resource use token to one client while keeping the other clients waiting.

Figure 37:
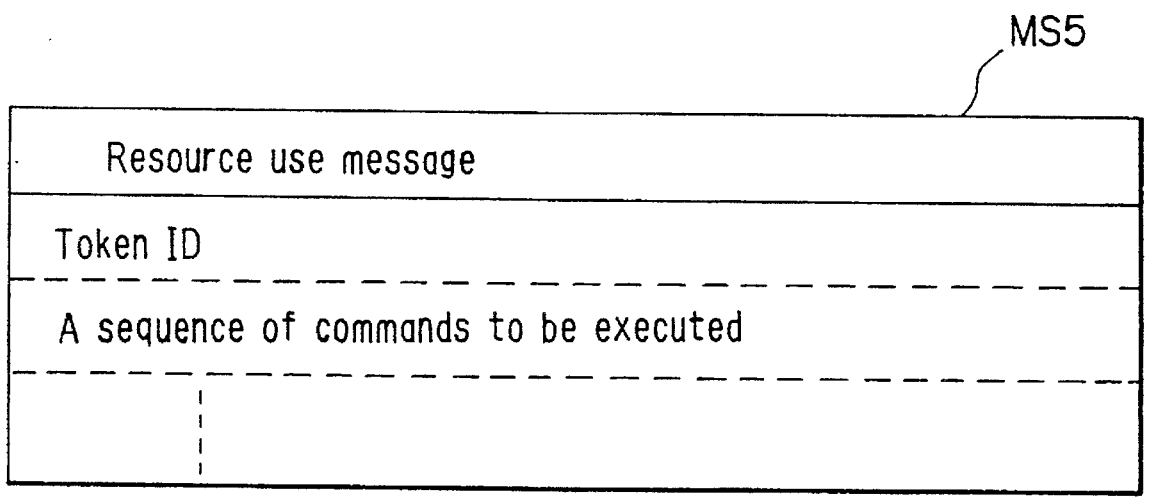
FIG. 37 is an explanatory view of a resource use message.

When a client receives the resource use token, the processes are distributed to the usable computers and a resource use message (processing asking message) MS5 including a token ID and a sequence of processing commands, as shown in FIG. 37, is transmitted to the agent AGT.

When the packet driven unit 68 receives the resource use message MS5, it transmits the message MS5 to the resource use controller 67. When the message MS5 is input, the resource use controller 67 reads the current resource situation out of the resource situation storage unit 61 and compares the resource situation with the contents of the resource use token which are read out of the token storage unit 65 by using the token ID as a keyword. If the change in the resource situation between the time at which the token was supplied and the time at which the resource use message MS5 is received is large, the resource scheduler 64 informs the client CLT that the resource use message MS5 is cancelled, and supplies a new resource use token. Alternatively, the resource scheduler 64 transmits a message to the client CLT stating that the processing will be delayed, thereby delaying the use of the resource until the resource becomes available.

On the other hand, if there is no change in the resource situation, the resource use controller 67 extracts and executes a sequence of processing commands, and supplies the result of the execution to the client. In this case, the connection controller 69 establishes a connection with the client CLT so as to output the result of the execution of the sequence of processing commands and the like.

The resource use controller 67 monitors the packet driven unit 68 so as to judge whether or not the resource use message MS5 has been received within the token valid time which is included in the resource use token, and if the message MS5 has not been received within the token valid time, the resource use controller 67 nullifies the supplied resource use token and instructs the resource scheduler 64 to supply a token to the next client. When the resource usable time limit designated by the token has elapsed, when the client does not use the computer for a predetermined time, or when the resource use controller 67 has received a token return message from the client, the resource use controller 67 cuts the connection and instructs the resource scheduler 64 to supply a token to the next client.

Other Controls

When the packet driven unit 68 is requested to supply the resource use information of a client by the domain resource manager DM, the packet driven unit 68 transmits the request to the resource scheduler 64. The resource scheduler 64 then transmits a message indicating the resource use information of the client to the domain resource manager DM.

When the packet driven unit 68 receives a resource use information message from the local resource unit LM of its own computer, the packet driven unit 68 transmits the message to the resource situation controller 63 so as to update the contents of the resource situation storage unit 61.

(g) Modification

In the above embodiments, the domain resource manager DM determines usable computers in answer to the request from a client CLT. Alternatively, the domain resource manager DM may have the function of a client so as to collect and control the situation data of each computer and distribute resources to the computers.

Although CPUs are distributed on the basis of the CPU usage in the above embodiments, the present invention is also applicable to distribution of memories, disks, etc.

As many apparently widely different embodiments of the present invention can be made without departing from the spirit and scope thereof, it is to be understood that the invention is not limited to the specific embodiments thereof except as defined in the appended claims.

What is claimed is:

1. A computer resource distributing method for distributing a multiplicity of processes to a plurality of computers connected in a network, said method comprising the steps of:

providing a scheduler, in one of said plurality of computers, for distributing the multiplicity of processes to at least one of said plurality of computers by using a scheduler in one computer of said plurality of computers, each of the multiplicity of processes having a respective estimated amount of processing and each respective computer of said plurality of computers having a respective cumulative amount of processing;

arranging said multiplicity of processes in order of the respective estimated amounts of processing associated with each of said multiplicity of processes;

monitoring each respective cumulative amount of processing corresponding to each of said respective computers of said plurality of computers, the cumulative amount of processing being a sum of the respective estimated amounts of processing for the processes distributed to said respective and corresponding computer;

distributing said processes based on the arranged order of the respective estimated amounts of the processing, to said plurality of computers in order of said respective cumulative amounts of processing, using said scheduler; and updating each said corresponding cumulative amount of processing in each of said respective computers by adding each said respective amount of processing of each process distributed to said respective cumulative amount of processing each time one of said multiplicity of processes is distributed to one of said plurality of computers.

2. A computer resource distributing method according to claim 1, wherein each said respective amount of processing is one of a number of respective processing steps needed to complete the respective process, an amount of computer time needed to complete the respective process, a number of respective processing steps performed within a selected unit time, a number of files required for performing the respective process and sizes of files required for performing the respective process.

3. A computer resource distributing method according to claim 1, further comprising the steps of:

obtaining actual amounts of processing when said processes are executed, an actual amount of processing obtained for each respective process executed;

storing said actual amounts of processing as execution record data; and producing, at a next distribution of said processes, new respective estimated amounts of processing for said multiplicity of processes based on said obtained actual amounts of processing of each said process, so as to enhance uniformity of the cumulative amount of processing in each of said plurality of computers.

4. A computer resource distributing method according to claim 1, further comprising the step of:

updating said cumulative amount of processing of the respective one of a plurality of computers by adding a value which is obtained by dividing said estimated amount of processing distributed to respective one of a plurality of computers by a processing speed (Vcpu) of a corresponding computer.

5. A computer resource distributing method according to claim 4, wherein each said computer of said plurality of computers has an associated utilization rate η of the computer, said method further comprising the step of:

correcting said processing speed (Vcpu) of said computer based on said associated utilization rate η using the following formula:

$$Veff = (100 - \eta) \cdot Vcpu/100$$

wherein Vcpu is the processing speed of the corresponding computer, and Veff is a processing speed of the corresponding computer after said correcting of said processing speed occurs.

6. A computer resource distributing method according to claim 5, wherein said associated utilization rate η is determined by the formula:

$$\eta = T' \cdot 100/T$$

wherein T' is a time for which the computer is utilized during a preselected time T.

7. A computer resource distributing method according to claim 1, further comprising the step of:

allotting said process to one computer of said plurality of computers with a higher processing speed if any other computer of said plurality of computers has an equal value of the cumulative amount of processing.

8. A computer resource distributing method for allotting a plurality of computers connected in a network to a client which requires selected computers of said plurality of computers to perform processes under control of a server, said method comprising the steps of:

preparing first data for each computer of said plurality of computers, indicative of a respective utilization rate and second data indicative of a respective reliability of said first data, each said respective reliability increasing when a variation of the respective utilization rate over a given period of time is small and decreasing when said variation is large in said respective computer;

supplying said first and second data from each respective computer of said plurality of computers, to the server which allots the selected computers to the client to perform processes; and allotting, by said server, the selected computers of said plurality of computers to said client on the basis of said first and second data.

9. A computer resource distributing method according to claim 8, wherein each said reliability is a valid time which increases when a variation of said respective utilization rate is small and decreases when said variation is large, for each said respective valid time of each computer, said server regarding the computer as objects of allotment.

10. A computer resource distributing method according to claim 8, further comprising the steps of:

supplying said first and second data to the server repeatedly at selected intervals; and prolonging the selected interval for supplying said first and second data to the server when said respective reliability is high and shortening the selected interval for supplying when said respective reliability is low.

11. A computer resource distributing method according to claim 9, further comprising the steps of:

decreasing said valid time, by said server, at predetermined intervals of time from when said first and second data are received by a respective computer; and excepting the respective computer from the objects of allotment to the client if the valid time of the respective computer is a selected value.

12. A computer resource distributing method according to claim 8, further comprising the step of:

inhibiting a computer, whose respective utilization rate exceeds a preset value, from supplying said first and second data to said server.

13. A computer resource distributing method according to claim 8, wherein each computer has a respective processing speed; and wherein said computer distributing method further comprises the steps of:

supplying the respective processing speed of each of said plurality of computers to said server together with said first and second data; and allotting some computers of said plurality of computers to said client, by said server, based on said respective first data, said respective second data and said respective processing speed.

14. A computer resource distributing method according to claim 8, further comprising the steps of:

supplying said first and second data, which have been prepared, of the computers which are allotted to said client, from said plurality of computers to the client; and distributing said processes to said allotted computers with reference to said first and second data.

15. A computer resource distributing method for allotting a plurality of computers connected in a network to a client which requires some of said plurality of computers for performing processes under control of a server, said method comprises the steps of:

providing a respective agent and a respective local resource manager in each of said computers, each agent supplying a message for permitting exclusive use of a respective computer of the plurality of computers, to the client and each local resource manager monitoring a respective utilization rate of said respective computer;

monitoring the respective utilization rate of each computer and transmitting the respective utilization rate from the local resource manager to said server;

requesting, to the server, use of the plurality of computers for performing said processes by the client;

determining, using said server, which computers of the plurality of computers are to be allotted to the client based on the respective utilization rate of each computer of said plurality of computers when said client requests use of any of said plurality of computers;

establishing a connection with said client, by each of said agents, of said allotted computers;

supplying said message from each said agent of said allotted computers to said client, so as to permit exclusive use of the computer said client requests use of; and distributing, by said client, said processes to said allotted computers.

16. A computer resource distributing method according to claim 15, further comprising the steps of:

determining the computers to be allotted for each client when a plurality of clients request the use of any of said plurality of computers;

establishing a connection with each respective client of the clients by each of said agents of said computers allotted to said client;

supplying said message to one predetermined client from said agents of said allotted computers so as to permit exclusive use of said computer; and supplying said message from each of said agents to another client to which said each of said agent is allotted so as to permit exclusive use of said computer when said predetermined client completes use of the requested computer of said plurality of computers.

17. A computer resource distributing method according to claim 15, wherein said distributing step by the client include:

arranging said processes in order of respective estimated amounts of processing;

monitoring respective cumulative amounts of processing of each of said allotted computers, each respective cumulative amount of processing being a sum of the amount of processing for all of the processes allotted to said respective computer;

distributing said processes based on the arranged order of respective estimated amounts of the processing of each said process to said plurality of said allotted computers in ascending order of said cumulative amount of processing of said allotted computers; and updating each said corresponding cumulative amount of processing in each of said respective allotted computers by adding each said respective amount of processing of each process distributed to said respective allotted computer to said respective cumulative amount of processing of said allotted computer, each time one process of said multiplicity of processes is distributed to one computer of said plurality of allotted computers.

18. A computer resource distributing method according to claim 15, further comprising the steps of:

adding, to said message, at least the respective utilization rate of the respective computer; and distributing said processes to said allotted computers on the basis of the utilization rate.

19. A computer resource distributing method according to claim 18, further comprising the steps of:

storing the utilization rate added to said message in a memory of said agents;

sending a message, from said client to said agents, requesting processing of at least one of said distributed processes;

comparing a respective current utilization rate of the respective computer when said agents received said message requesting processing with said stored utilization rate; and inhibiting said agent of the respective computer from performing said distributed processes when there is a specified change in said utilization rate of the respective computer.

20. A computer resource distributing method according to claim 18, further comprising the step of:

storing the utilization rate added to said message in a memory of said agents;

sending a message, from said client to said agents, requesting processing of at least one of said distributed processes;

comparing a respective current utilization rate of the respective computer when said agents received said message requesting processing with said stored utilization rate; and transmitting a message from said agent to said client indicating said processing will be delayed until the respective computer becomes available when there is a specified change in said utilization rate of the respective computer.

21. A computer resource distributing method according to claim 19, further comprising the steps of:

notifying said client that said agent will not perform the distributed processes, when a specified change in said utilization rate of the respective computer is detected;

supplying a new message including the respective current utilization rate of the respective computer as a new utilization rate to said client, from said agent, to permit exclusive use of said respective computer; and distributing said processes to said allotted computers based on the new utilization rate, by said client.

22. A computer resource distributing method according to claim 15, further comprising the steps of:

providing, in said client, a mechanism for detecting a breaking of said connection to said agent;

detecting a breaking of the connection to a predetermined agent after establishing the connection; and distributing said processes to all of said allotted computers except to the computer corresponding to said agent which detects the breaking of the connection with said client.

23. A computer resource distributing method according to claim 17, wherein each of said processes has a respective amount of processing; and wherein each said respective amount of processing is one of a number of steps of processing a respective process needs to complete the respective process, an amount of computer time the respective process needs to complete the respective process, a number of respective steps of processing performed within a selected unit time, a number of files required for performing the respective process and sizes of files required for performing the respective process.

24. A computer resource distributing system for distributing a multiplicity of processes to a plurality of computers connected in a network, said system comprising:

a client for requesting the use of a plurality of computers to perform a multiplicity of processes;

a server for allotting the computers to said client based on utilization rates, each of said plurality of computers having a respective utilization rate, when said client requests the use of the plurality of computers;

a resource manager, provided in each of said plurality of computers, which monitors the utilization rate of a respective computer of said plurality of computers and transmits the utilization rate to said server; and an agent, provided in each of the allotted computers, which transmits a message permitting exclusive use of the respective computer, to said client, said agent of a computer being allotted to said client supplying said message to said client and, thereafter, said client distributing said processes to said allotted computers.

25. A computer resource distributing system according to claim 24, wherein:

said resource manager transmits data indicative of a reliability of said utilization rate, said reliability increasing when a variation of said utilization rate over a given period of time is small and decreasing when said variation is large; and said server allots computers to the client based on said utilization rate and said data.

26. A computer resource distributing system according to claim 24, wherein said client:

arranges said processes in order of amount of processing;

monitors each respective cumulative amount of processing corresponding to each of said respective computers of said plurality of computers, each plurality of computers having a respective cumulative amount of processing, the cumulative amount of processing being a sum of the respective estimated amounts of processing for the processes allotted to the respective and corresponding computer;

distributes said processes based on the arranged order of the respective estimated amounts of the processing to said plurality of computers in ascending order of the respective cumulative amounts of processing of each of said computers, using said scheduler; and updates the respective cumulative amounts of processing in each of said plurality of computers by adding each said respective amount of processing of the process distributed to the respective computer, to the cumulative amount of processing of the respective computer each time one of said processes is distributed to one of said plurality of computers.

27. A computer resource distributing method according to claim 26, wherein each of said processes has a respective amount of processing; and wherein each said respective amount of processing is one of a number of steps of processing a respective process needs to complete the respective process, an amount of computer time the respective process needs to complete the respective process, a number of respective steps of processing performed within a selected unit time, a number of files required for performing the respective process and sizes of files required for performing the respective process.

* * * * *